United States Patent
Yamazaki et al.

[11] Patent Number: 5,904,730
[45] Date of Patent: May 18, 1999

[54] DEVICE OF DETECTING VEHICLE COLLISION AND DEVICE OF DETERMINING START-UP OF PASSENGER PROTECTING DEVICE

[75] Inventors: Yoshiaki Yamazaki; Akihiko Imagi; Takashi Furui; Yukihiro Okimoto, all of Tokyo, Japan

[73] Assignee: Mitsubishi Denki Kabushiki Kaisha, Tokyo, Japan

[21] Appl. No.: 08/801,582

[22] Filed: Feb. 14, 1997

[30] Foreign Application Priority Data

Sep. 20, 1996 [JP] Japan .................................. 8-250331

[51] Int. Cl.⁶ ....................................................... G01S 7/78
[52] U.S. Cl. ............................ 701/301; 701/45; 180/271
[58] Field of Search ................................... 701/45, 47, 49, 701/307; 340/903; 180/232, 268, 271–282; 280/735

[56] References Cited

U.S. PATENT DOCUMENTS

| | | | |
|---|---|---|---|
| 4,095,666 | 6/1978 | Baba et al. ............................... | 701/301 |
| 5,309,138 | 5/1994 | Tohbaru ................................... | 340/436 |
| 5,667,244 | 9/1997 | Ito et al. ................................... | 701/47 |
| 5,732,374 | 3/1998 | Ohm .......................................... | 701/45 |
| 5,777,227 | 7/1998 | Cho et al. ............................. | 73/514.38 |

FOREIGN PATENT DOCUMENTS

| | | |
|---|---|---|
| A-4-252758 | 9/1992 | Japan . |
| A-6-48263 | 2/1994 | Japan . |
| A-8-119055 | 5/1996 | Japan . |

*Primary Examiner*—William A. Cuchlinski, Jr.
*Assistant Examiner*—Gertrude Arthur
*Attorney, Agent, or Firm*—Sughrue, Mion, Zinn, Macpeak & Seas, PLLC

[57] ABSTRACT

A device of detecting collision of a vehicle for determining collision of a vehicle based on an acceleration from an acceleration detecting means for detecting a collision acceleration of the vehicle, the device including a collision force calculating means for calculating an estimated collision force caused in the vehicle in the collision based on the collision acceleration and a collision determining means for determining the collision based on the estimated collision force.

10 Claims, 19 Drawing Sheets

(a) COLLISION FORCE $f$ (b) EQUIVALENT VEHICLE ACCELERATION $\ddot{x}_1$ (c) EQUIVALENT VEHICLE VELOCITY $\dot{x}_1$ (d) EQUIVALENT VEHICLE DISPLACEMENT $x_1$

LOCUS ON COLLISION FORCE-VELOCITY PHASE PLANE

LOCUS ON ESTIMATED COLLISION FORCE-ESTIMATED VELOCITY PHASE PLANE

LOCUS ON ESTIMATED COLLISION FORCE-ESTIMATED DISPLACEMENT PHASE PLANE

LOCUS ON ESTIMATED COLLISION FORCE-ACCELERATION PHASE PLANE

DOOR CLOSING

SIDE COLLISION

LOCUS ON PHASE PLANE IN DOOR CLOSING

LOCUS ON PHASE PLANE IN SIDE COLLISION (LOW VELOCITY)

LOCUS ON PHASE PLANE IN SIDE COLLISION (INTERMEDIATE SPEED)

LOCUS ON PHASE PLANE IN SIDE COLLISION (HIGH SPEED)

ced by the ignition device 76 65
operates, for example, an air bag based on an output from the
driving circuit 76.

DEVICE OF DETECTING VEHICLE COLLISION AND DEVICE OF DETERMINING START-UP OF PASSENGER PROTECTING DEVICE

BACKGROUND OF THE INVENTION

1. Field of the Invention

The present invention relates to a device for detecting a collision of a vehicle when the vehicle is brought into collision, in a short period of time with high reliability and a device for initiating the passenger protecting device.

2. Discussion of the Background

Conventionally, a passenger protecting device such as an air bag etc. is operated by using a collision detecting device for detecting collision of a vehicle from the magnitude of acceleration of the vehicle. A collision detecting device for detecting collision of a vehicle more swiftly and firmly is disclosed in Japanese Unexamined Patent Publication JP-A-4-135947.

FIG. 25 is a block diagram showing a driving circuit of a conventional passenger protecting device for a vehicle, FIG. 26(A) is a diagram showing a change over time in an output of an acceleration sensor in collision and FIG. 26(B) is a diagram showing a displacement of a head portion of a passenger.

In FIG. 25 numeral 69 designates an acceleration sensor for detecting a change in an acceleration caused by collision or the like of a vehicle and outputting the detection result as an analog signal a(t). Numeral 70 designates a first incomplete integrating circuit having a time constant $T_1$ for integrating the analog signal a(t) outputted from the acceleration sensor 69, and numeral 71 designates a second incomplete integrating circuit having a function the same as that of the first incomplete integrating circuit 70 for processing an incomplete integration output v(t) from the first incomplete integrating circuit again to incomplete integration. The time constant $T_2$ of the second incomplete integrating circuit 71 is the same as the time constant $T_1$ of the first incomplete integrating circuit 70.

Numeral 72 designates a first coefficient circuit comprising a first damper for adding a first coefficient to the detected output from the acceleration sensor 69, numeral 73 designates a second coefficient circuit comprising a second damper having a damping rate of K and the second coefficient circuit 73 adds a second coefficient to the incomplete integration output v(t) from the first incomplete integrating circuit 70. Further, the damping rate of the first coefficient circuit 72 is a half of a square of the damping rate K of the second coefficient circuit 73. Incidentally, the above-described damping rate K is equal to a time period td, required from supplying an ignition current to an ignition device of an air bag, mentioned later, to the completion of expansion of the air bag.

Numeral 74 designates an adding circuit and the adding circuit 74 adds an output x(t) from the second incomplete integrating circuit 71, an output from the first coefficient circuit 72 and an output from the second coefficient circuit 73. Numeral 75 designates a comparing circuit switching the output level to, for example, high level when the added output from the adding circuit 74 exceeds a predetermined threshold value, numeral 76 designates a driving circuit, numeral 77 designates an ignition device that is a main body of a passenger protecting device and the ignition device 76 operates, for example, an air bag based on an output from the driving circuit 76.

Next, an explanation will be given of the operation of the conventional device.

First, when a vehicle is running at a constant velocity V0, if the acceleration a(t) operating in the forward and rearward direction of the vehicle as illustrated by FIG. 26(A) is detected by the acceleration sensor 69, the head of the passenger is thrown at the constant speed v0, while the acceleration a(t) at that time is operating also on the passenger, whereby the head starts to move at a relative velocity in respect of the vehicle, that is, v(t) (integral over time of a(t)).

Meanwhile, the output a(t) of the acceleration sensor 69 at that time is integrated by the first incomplete integrating circuit 70. Also, when the position of the head immediately before collision is set to an initial position, the head is displaced by x(t) (integral over time of v(t)) from the initial position following a time-sequential procedure in accordance with the starting of the movement. The displacement x(t) is calculated by integrating the output of the first incomplete integrating circuit 70 by the second incomplete integrating circuit 71 whereby an estimated amount of displacement of the head of the passenger in the actual time is calculated.

Next, the output v(t) from the first incomplete integrating circuit 70 is weighted by td by the second coefficient circuit 73 whereby v(t)×td, that is, an amount of displacement in a time period of td is calculated. Further, the output a(t) from the acceleration sensor 69 is weighted by ½(td×td) by the first coefficient circuit 72 whereby ½(td×td), that is, an amount of displacement in a time period of td is calculated. The outputs are added by the adding circuit 74 whereby x(t)+v(t)td+½a(t)×(td×td) is calculated. That is, by this operation a predicted value of x(t+td) for the position of the head of the passenger after the time period of td from the current time point is calculated.

The predicted position is supplied to the comparing circuit 75 and when the position of operating an air bag etc. is set to a position which is dislocated from the initial position by x in FIG. 26(B), the air bag is operated at a time point t1 that is earlier than a time point t2 where the position of the head actually reaches x by the time period of td as illustrated by a curve x(t).

As described above, according to the conventional example the displacement of the head of the passenger is calculated from the acceleration signal in accordance with the above-mentioned equation and when the calculated displacement of the head of the passenger is determined to be equal to or larger than a predetermined amount, the passenger protecting device is operated.

The following problems occur with the conventional passenger protecting device for a vehicle as described above.

(1) In order to shorten the determining time the predicted displacement signal x(t+td)=x(t)+v(t)td+½a(t)×(td×td) provided by adding the acceleration and the velocity respectively multiplied by the coefficients to the displacement signal x(t), is calculated. However, the predicted displacement signal x(t+td) is only a value for determining the collision earlier than the normal determination by the displacement of the passenger. Further, the predicted displacement signal x(t+td) is not the value accurately showing the displacement of the passenger and therefore, even in the case where the operation of the passenger protecting device is not necessary, the passenger protecting device may prematuredly be operated whereby the reliability of the collision determination is deteriorated.

(2) The conventional passenger protecting device does not correspond to various collision modes such as front collision, oblique collision, collision to a pillar or the like, running on a road shoulder, running under a large-sized vehicle etc. and the passenger protecting device may be unnecessarily operated or the determination of collision may be retarded depending on the collision mode.

(3) The threshold value at the comparator used in the determination of collision stays constant irrespective of a change over time and cannot sufficiently correspond to various collision modes and the passenger protecting device may unnecessarily be operated or the determination of collision may be retarded depending on the collision mode.

(4) The determination of collision may be retarded in expanding a side air bag corresponding to a collision from a side direction which requires a collision determining time further shorter than that in the front collision in the forward and rearward direction.

SUMMARY OF THE INVENTION

The present invention has been carried out in order to solve the above-described problems and it is an object of the present invention to provide a device of detecting the collision of a vehicle and a device for determining a start-up of a passenger protecting device capable of corresponding to various collision modes of a vehicle and carrying out highly reliable collision determination in a shorter period of time.

According to a first aspect of the present invention, there is provided a device for detecting a collision of a vehicle based on an acceleration from an acceleration detecting means for detecting a collision acceleration of the vehicle, the device comprising a collision force calculating means for calculating an estimated collision force caused in the vehicle in the collision based on the collision acceleration, and a collision determining means for determining the collision based on the estimated collision force.

According to a second aspect of the present invention, there is provided the device for detecting a collision of a vehicle according to the first aspect, further comprising a velocity calculating means for calculating an estimated velocity from the collision acceleration, a displacement calculating means for calculating an estimated displacement from the estimated velocity and wherein the collision force calculating means calculates the estimated collision force caused in the vehicle in the collision based on the collision acceleration, the estimated velocity and the estimated displacement.

According to a third aspect of the present invention, there is provided the device for detecting a collision of a vehicle according to the second aspect, wherein the collision determining means determines the collision in accordance with coordinate values in a multidimensional coordinate system having variables of the estimated collision force, the collision acceleration, the estimated velocity and the estimated displacement.

According to a fourth aspect of the present invention, there is provided the device for detecting a collision of a vehicle according to any one of the first aspect through the third aspect, wherein the collision calculating means calculates the estimated collision force by using a model of the vehicle having one degree of freedom comprising a mass, a damper and a spring.

According to a fifth aspect of the present invention, there is provided the device for detecting a collision of a vehicle according to any one of the first aspect through the fourth aspect, wherein the collision determining means calculates an estimated relative displacement of a passenger with respect to the vehicle and determines the collision based on the estimated relative displacement and the estimated collision force.

According to a sixth aspect of the present invention, there is provided the device for detecting a collision of a vehicle according to any one of the first aspect through the fifth aspect, further comprising a first-order lag element type filter for calculating the estimated velocity from the collision acceleration, and a first-order lag element type filter for calculating the estimated displacement from the estimated velocity.

According to a seventh aspect of the present invention, there is provided a device for determining a start-up of a passenger protecting device comprising a collision force calculating means for calculating an estimated collision force caused in a vehicle in collision based on a collision acceleration from an acceleration detecting means for detecting the collision acceleration of the vehicle, and a start-up determining means for determining start-up of a passenger protecting device based on the estimated collision force.

According to an eighth aspect of the present invention, there is provided the device for determining a start-up of a passenger protecting device according to the seventh aspect, further comprising a velocity calculating means for calculating an estimated velocity from the collision acceleration, and wherein the start-up determining means starts up the passenger protecting device when the estimated velocity is equal to or larger than a threshold value and the threshold value is determined based on a magnitude of the collision force.

According to a ninth aspect of the present invention, there is provided the device for determining a start-up of a passenger protecting device according to the seventh aspect or the eighth aspect, further comprising a plurality of acceleration detecting means set in the vehicle for detecting a plurality of the collision accelerations respectively in different directions, and wherein the start-up determining means determines the start-up from the passenger protecting device based on outputs of the plurality of acceleration detecting means.

DETAILED DESCRIPTION OF PREFERRED EMBODIMENTS

An explanation will be given of an embodiment of the present invention as follows.

Embodiment 1

Figure 1:
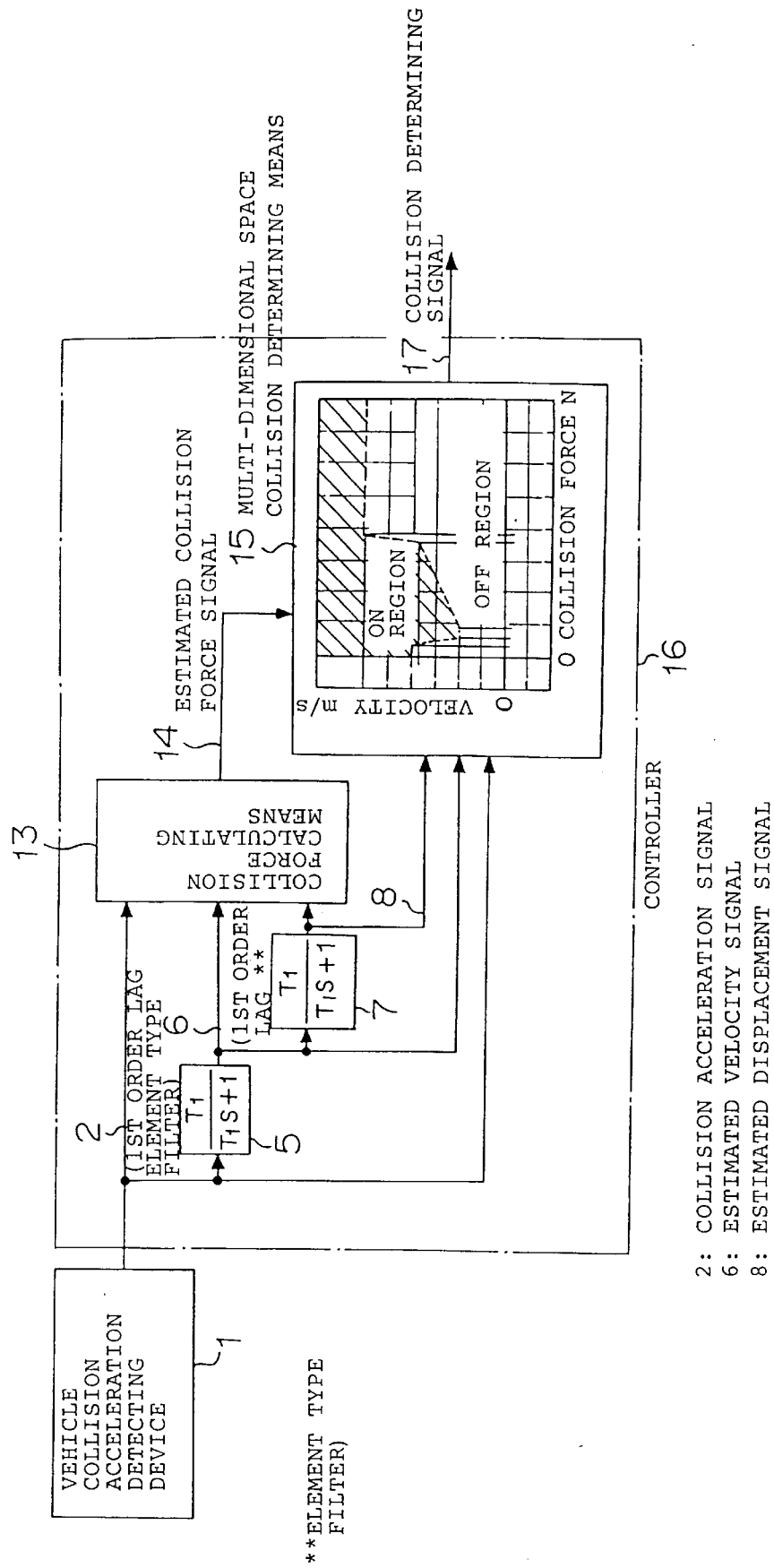
FIG. 1 is a block diagram showing a device for detecting a collision of a vehicle according to Embodiment 1 of the present invention.
Figure 2:
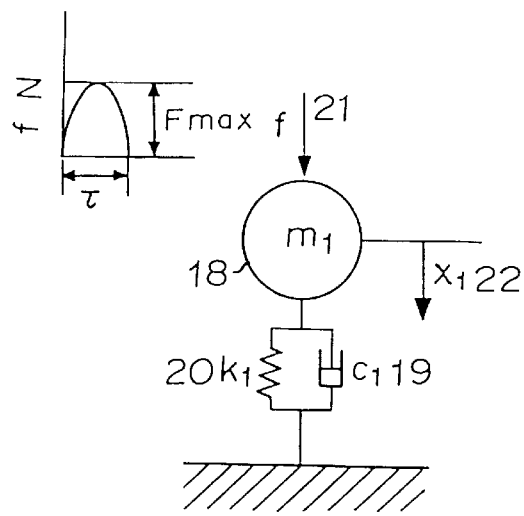
FIG. 2 is a conceptual diagram showing a mass-damper-spring model having one degree of freedom that is used in calculation by a collision force calculating means according to Embodiment 1 of the present invention.
Figure 3:
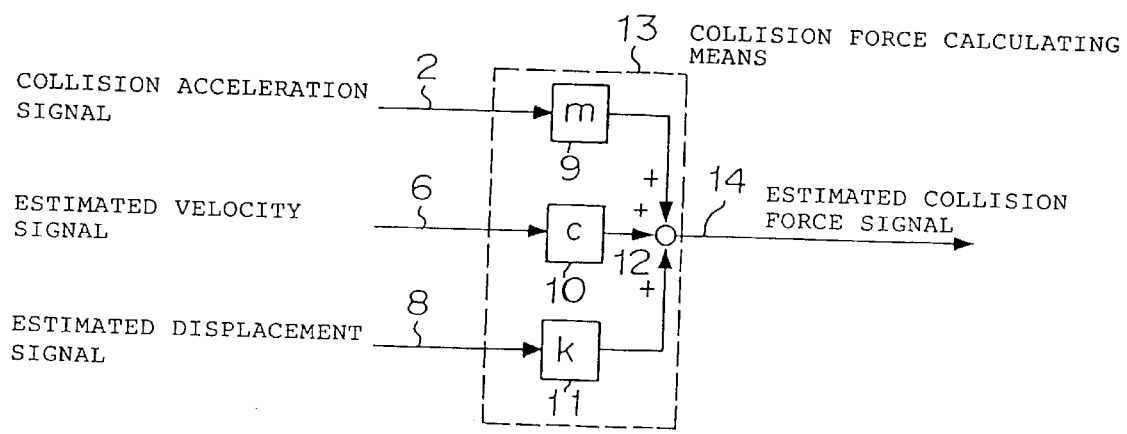
FIG. 3 is a block diagram showing calculation procedure of an estimated collision force based on the mass-damper-spring model having one degree of freedom by the collision force calculating means inside of a device for detecting a collision of a vehicle according to Embodiment 1 of the present invention.

FIG. 1 is a block diagram showing a device for detecting a collision for a vehicle according to Embodiment 1 of the present invention, FIG. 2 is a conceptual view showing a mass-damper-spring model having one degree of freedom indicating the principle of a collision force calculating means at the inside of a collision detecting device, FIG. 3 is a block diagram showing the calculation procedure of an estimated collision force based on the mass-damper-spring model having one degree of freedom in the collision force calculating means at the inside of the collision detecting devices and FIGS. 4(a), 4(b), 4(c) and 4(d) illustrate waveform diagrams showing a simulation result of time-sequential response waveforms of an acceleration, a velocity and a displacement caused in a vehicle equivalent mass when a collision force f is applied to the mass-damper-spring model having one degree of freedom in the collision detecting device.

Figure 5:
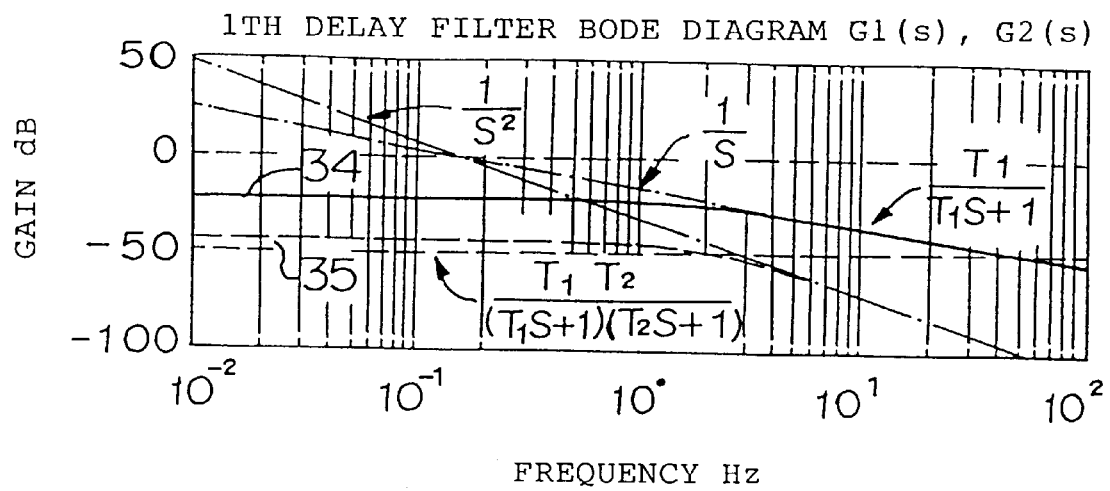
FIG. 5 illustrates explanatory diagrams showing an example of the frequency response characteristic of a first-order lag element type filter in the device for detecting a collision of a vehicle according to Embodiment 1 of the present invention.
Figure 5:
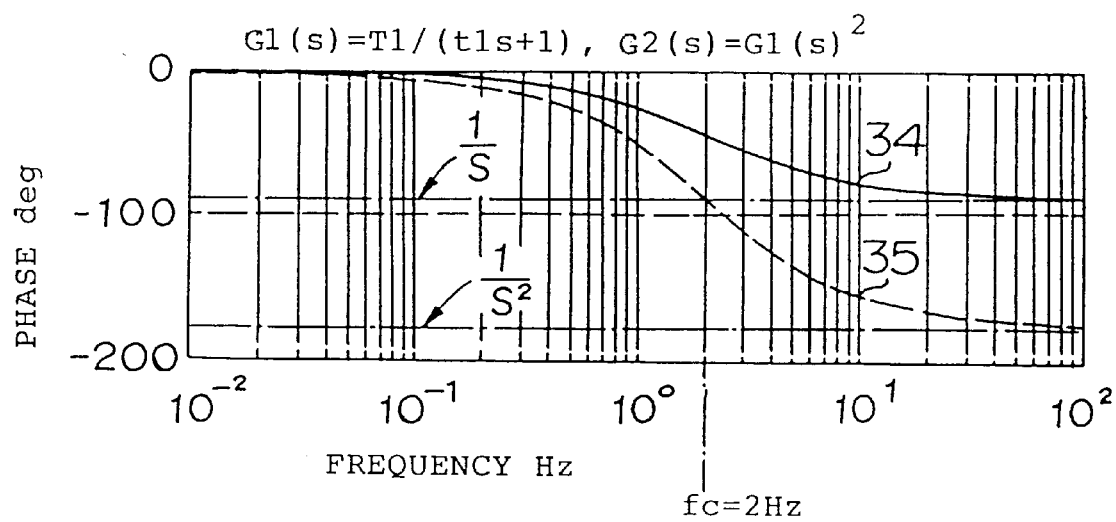
Figure 6:
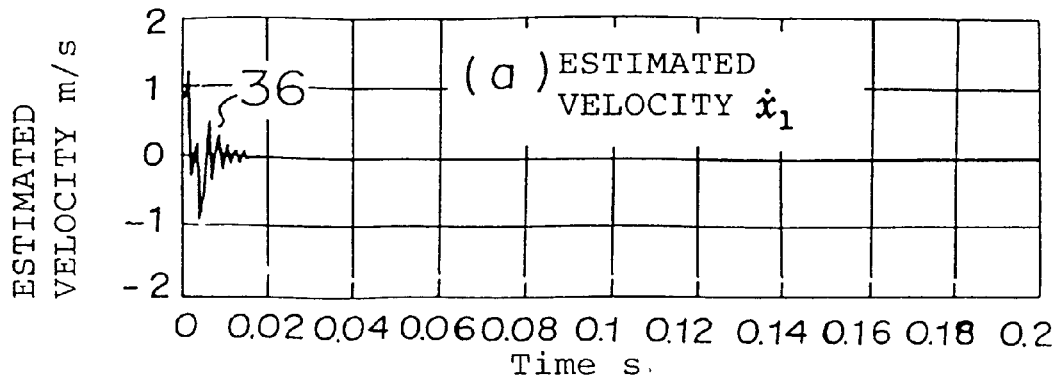
FIG. 6($a$), 6($b$) and 6($c$) are explanatory diagrams showing a simulation result of an estimated velocity, an estimated displacement and an estimated collision force indicating the principle of the estimated collision force in the device of detecting collision of a vehicle according to Embodiment 1 of the present invention.
Figure 6:
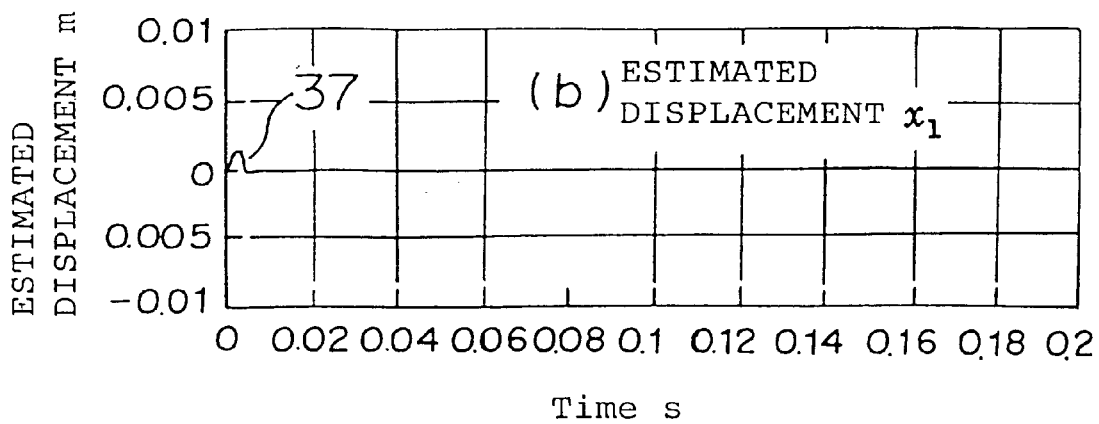
Figure 6:
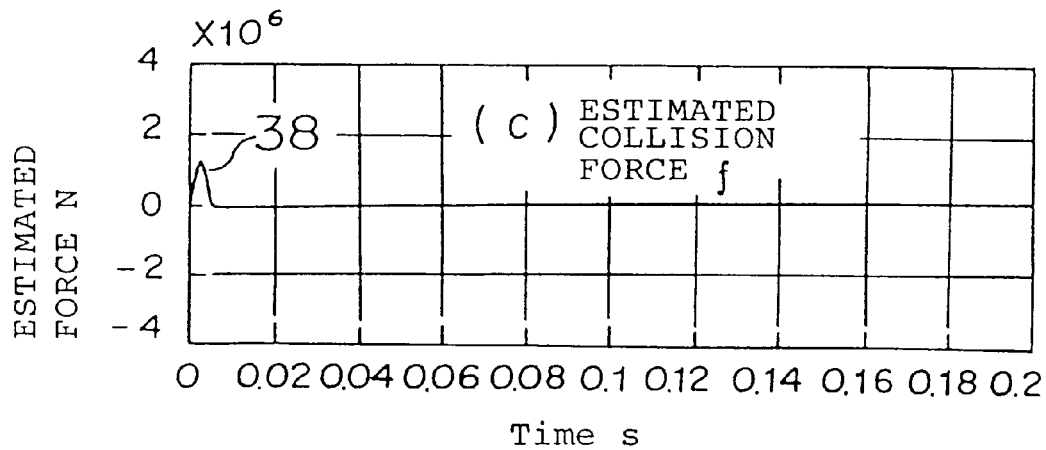
Figure 7:
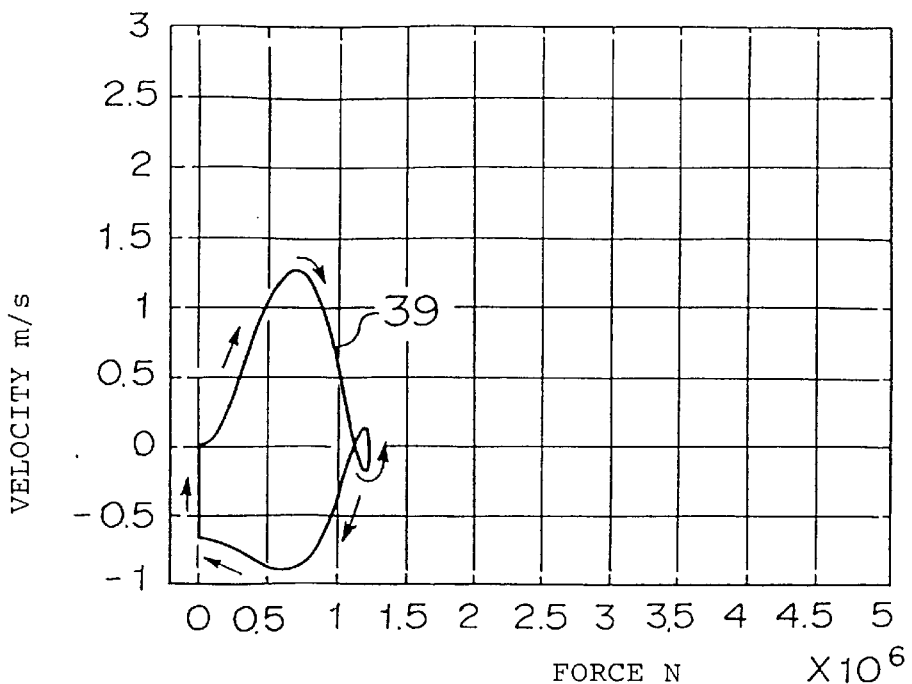
FIG. 7 is an explanatory diagram showing a locus of a collision force in respect of a velocity in elastic collision in a plane where the collision force of a multi-dimensional space collision determining means is designated by the axis of abscissa and the velocity is designated by the axis of ordinate in the device of detecting collision of a vehicle according to Embodiment 1 of the present invention.
Figure 8:
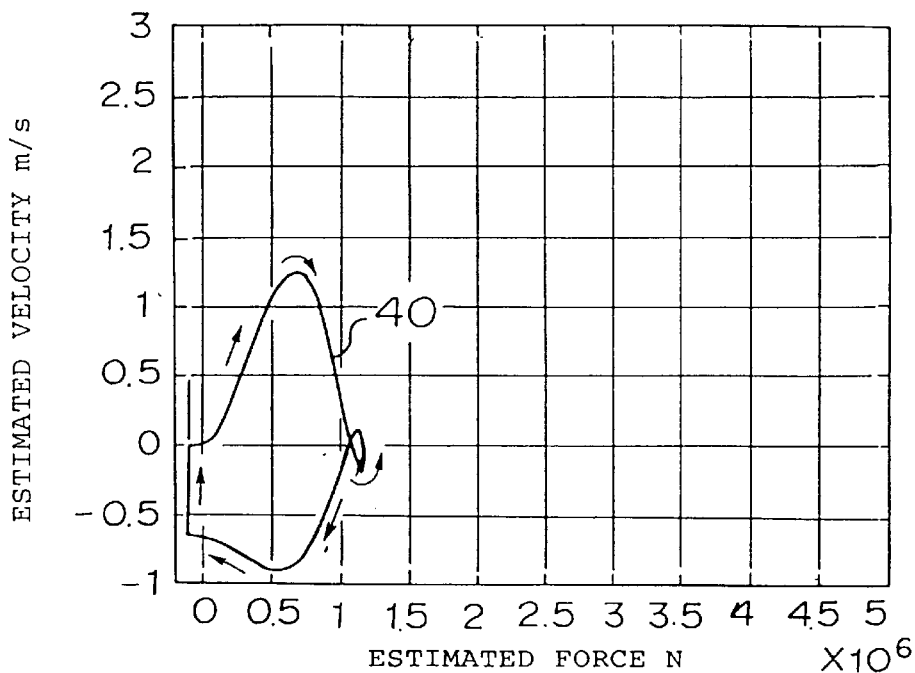
FIG. 8 is an explanatory view showing a locus of an estimated collision force in respect of an estimated velocity in elastic collision in a plane where the collision force of the multi-dimensional space collision determining means is designated by the axis of abscissa and the velocity thereof is designated by the axis of ordinate in the device of detecting collision of a vehicle according to Embodiment 1 of the present invention.
Figure 9:
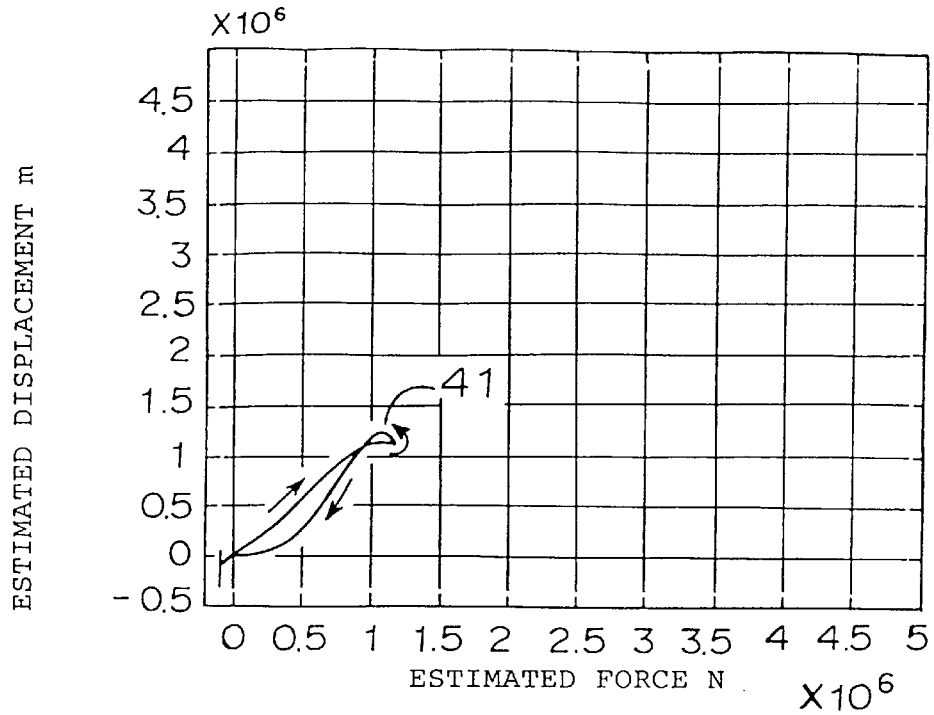
FIG. 9 is an explanatory diagram showing a locus of an estimated collision force in respect of an estimated displacement in elastic collision in a plane where the collision force of the multi-dimensional space collision determining means is designated by the axis of abscissa and the displacement thereof is designated by the axis of ordinate in the device of detecting collision of a vehicle according to Embodiment 1 of the present invention.
Figure 10:
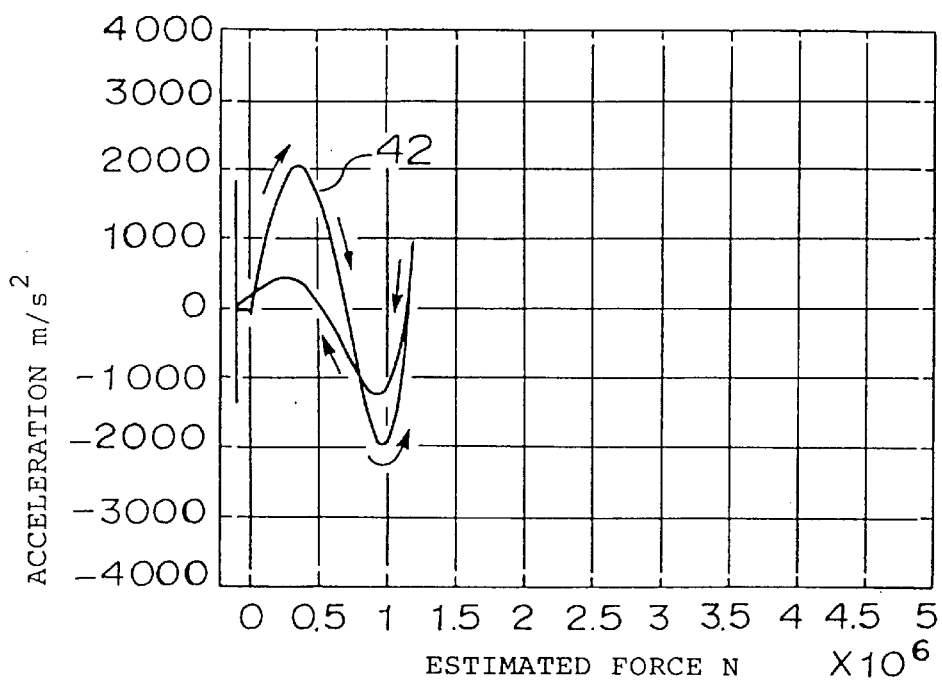
FIG. 10 is an explanatory diagram showing a locus of an estimated collision force in respect of an acceleration in elastic collision in a plane where the collision force of the multi-dimensional space collision determining means is designated by the axis of abscissa and the acceleration is designated by the axis of ordinate in the device of detecting collision of a vehicle according to Embodiment 1 of the present invention.

FIG. 5 illustrates characteristic diagrams showing an example of the frequency response characteristic of first-order lag element type filters in the collision detecting device, FIGS. 6(a), 6(b) and 6(c) are waveform diagrams showing a simulation result of an estimated velocity, an estimated displacement and an estimated collision force indicating the principle of calculating the estimated collision force according to the collision detecting device, FIG. 7 is an explanatory diagram showing a relation between the collision force and the velocity in elastic collision according to a multi-dimensional space collision determining means, FIG. 8 is an explanatory view showing a relation between the estimated collision force and the estimated velocity in elastic collision according to the multi-dimensional space collision determining means, FIG. 9 is an explanatory diagram showing a relation between the estimated collision force and the estimated displacement in elastic collision according to the multi-dimensional space collision determining means and FIG. 10 is an explanatory diagram showing a relation between the estimated collision force and the acceleration in elastic collision according to the multi-dimensional space collision determining means.

Figure 11A:
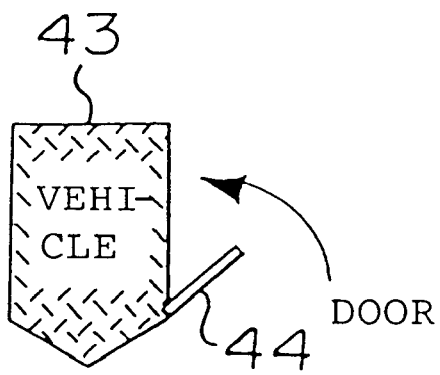
FIGS. 11(A) and 11(B) are explanatory views showing door closing of a vehicle and side collision of other vehicle which are exemplified to indicate the principle of multi-dimensional space collision determination in the device of detecting collision of a vehicle according to Embodiment 1 of the present invention.
Figure 11B:
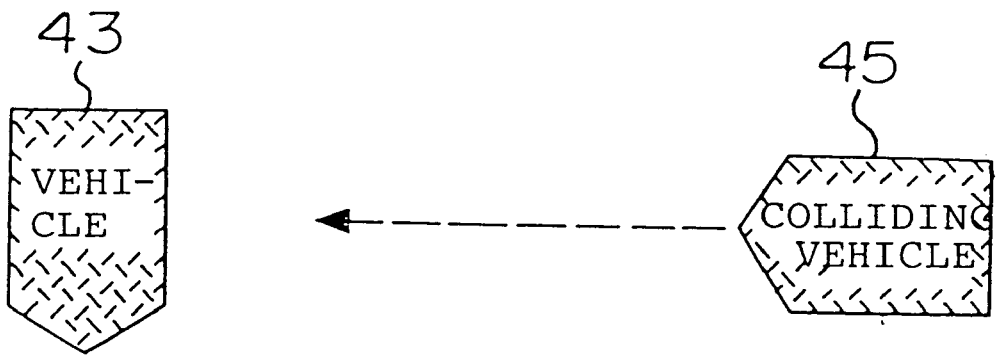
Figure 12:
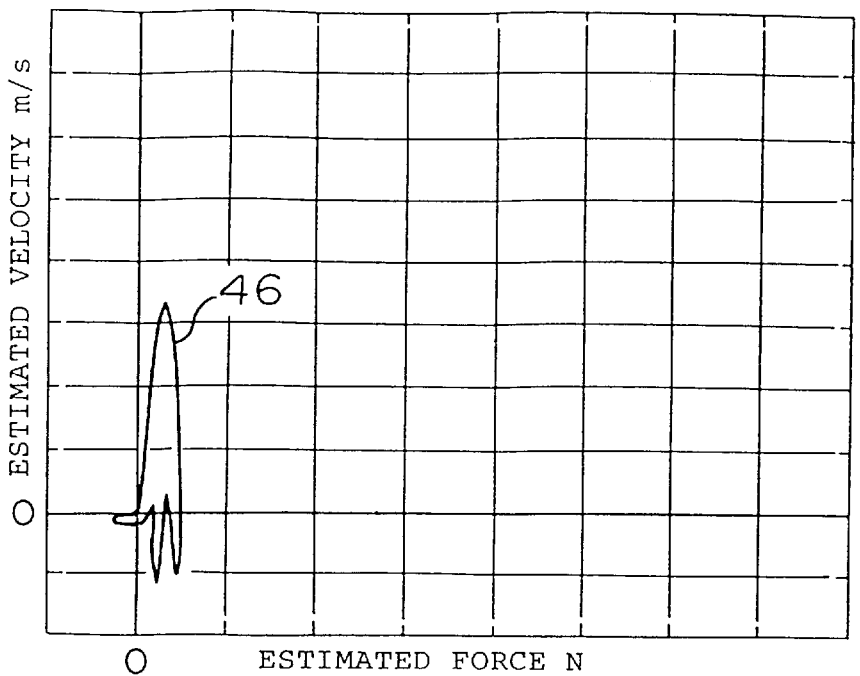
FIG. 12 is an explanatory diagram showing a locus of an estimated collision force in respect of an estimated velocity caused in door closing in a plane where the collision force of the multi-dimensional space collision determining means is designated by the axis of abscissa and the velocity thereof is designated by the axis of ordinate in the device of detecting collision of a vehicle according to Embodiment 1 of the present invention.
Figure 13:
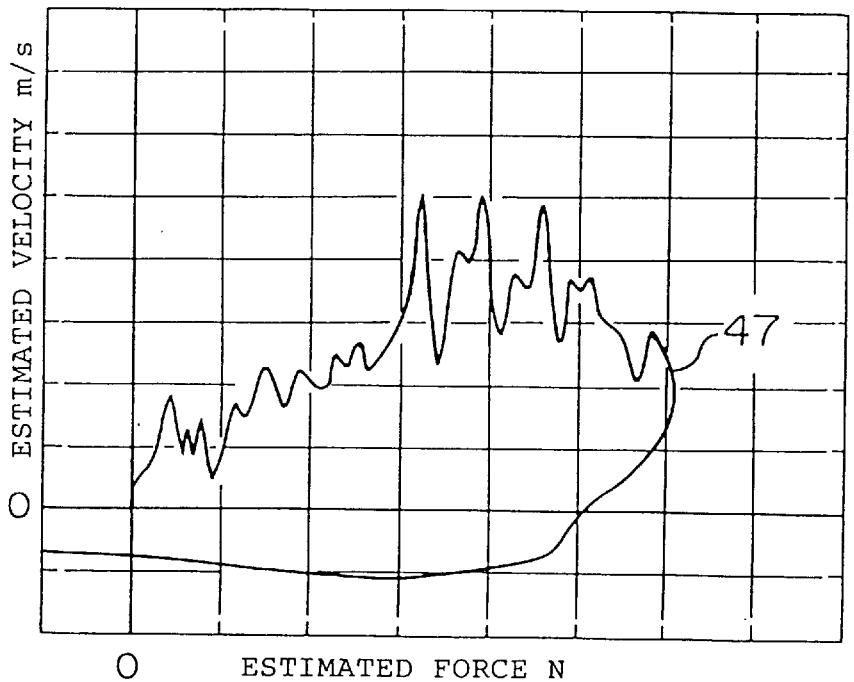
FIG. 13 is an explanatory diagram showing a locus of an estimated collision force in respect of an estimated velocity caused in assuming a side collision at a low velocity in a plane where the collision force of the multi-dimensional space collision determining means is designated by the axis of abscissa and the velocity thereof is designated by the axis of ordinate in the device of detecting collision of a vehicle according to Embodiment 1 of the present invention.
Figure 14:
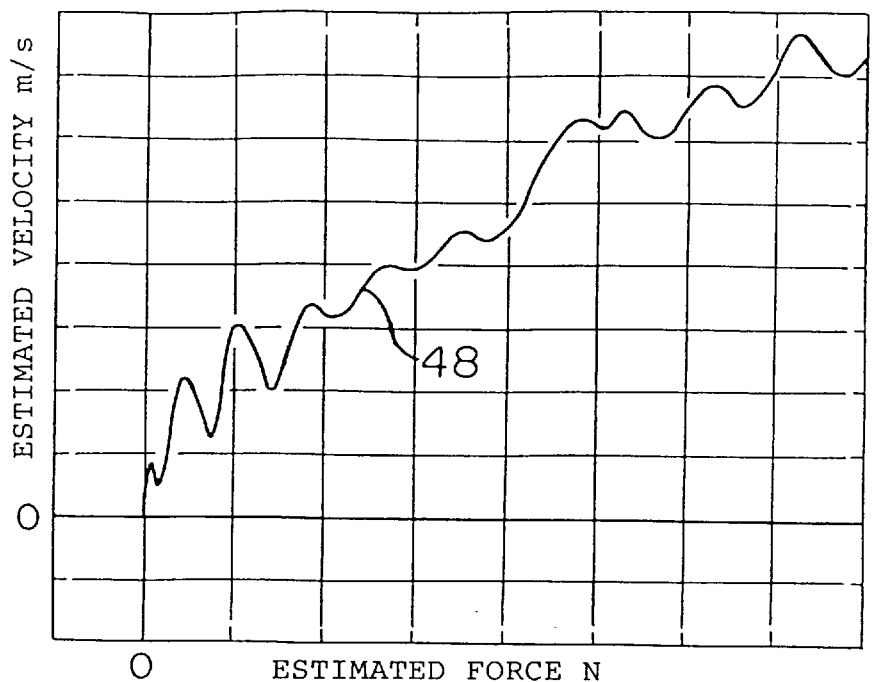
FIG. 14 is an explanatory diagram showing a locus of an estimated collision force in respect of an estimated velocity caused in assuming a side collision at an intermediate velocity in a plane where the collision force of the multi-dimensional space collision determining means is designated by the axis of abscissa and the velocity thereof is designated by the axis of ordinate in the device of detecting collision of a vehicle according to Embodiment 1 of the present invention.
Figure 15:
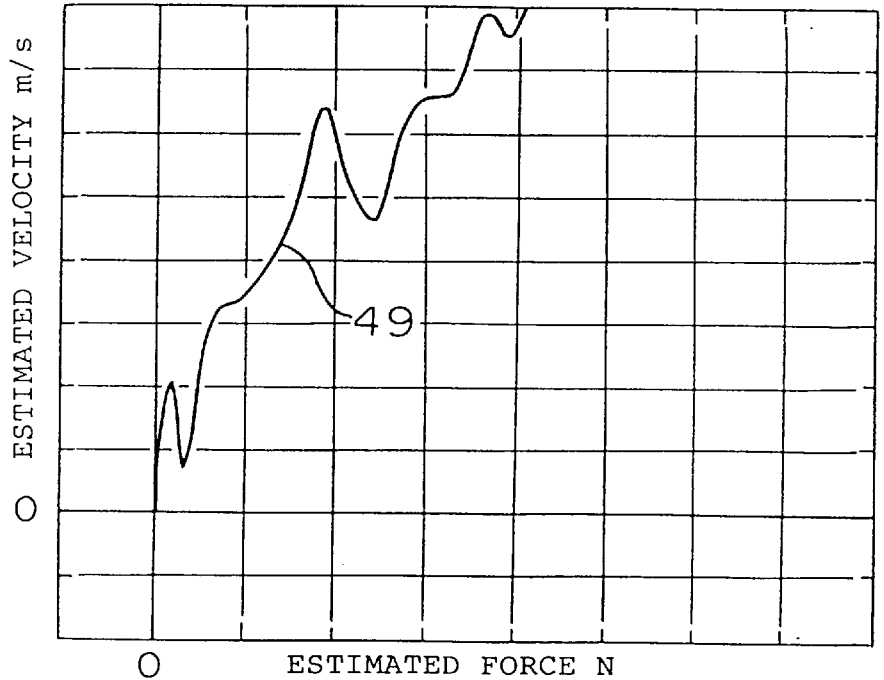
FIG. 15 is an explanatory diagram showing a locus of an estimated collision force in respect of an estimated velocity caused in assuming a side collision at a high velocity in a plane where the collision force of the multi-dimensional space collision determining means is designated by the axis of abscissa and the velocity thereof is designated by the axis of ordinate in the device of detecting collision of a vehicle according to Embodiment 1 of the present invention.
Figure 16:
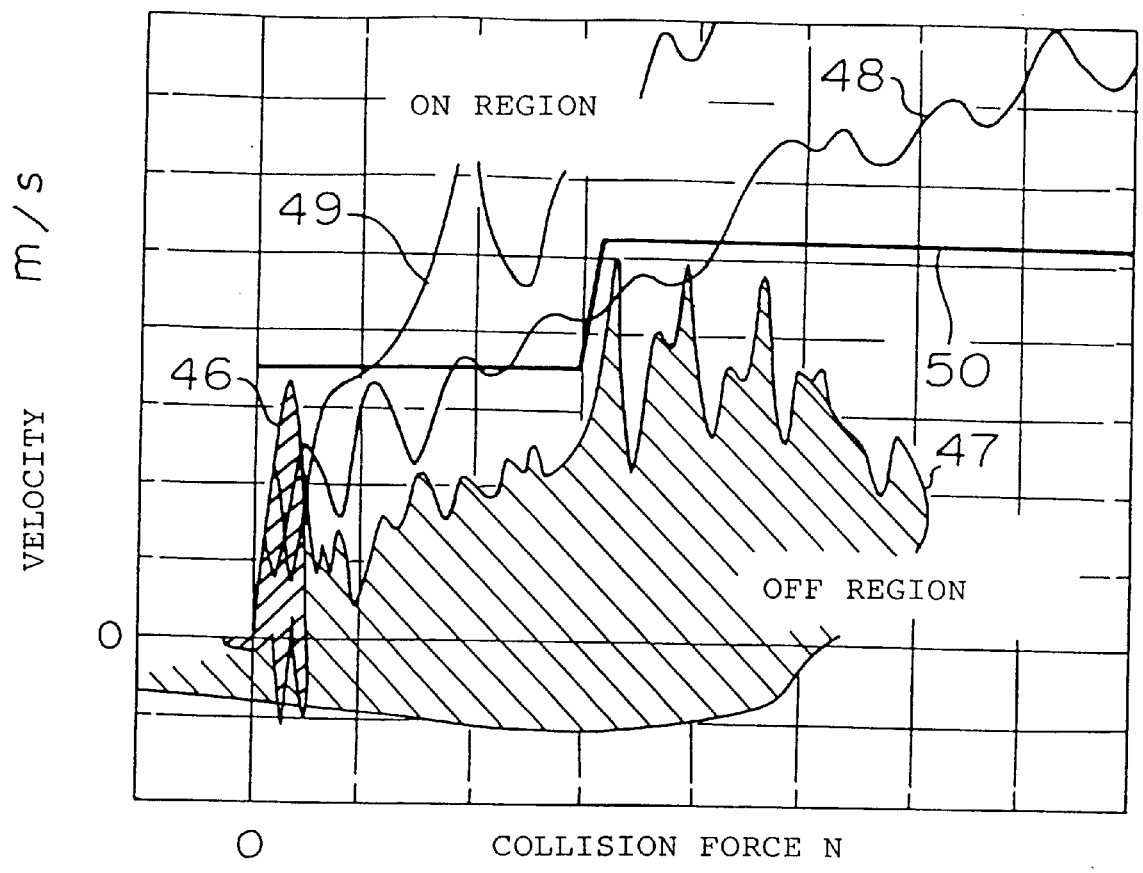
FIG. 16 is an explanatory diagram showing an example of setting a threshold value in a plane where the collision force of the multi-dimensional space collision determining means is designated by the axis of abscissa and the velocity thereof is designated by the axis of ordinate in the device of detecting collision of a vehicle according to Embodiment 1 of the present invention.

FIGS. 11(A) and 11(B) are explanatory views showing door closing of a vehicle and a side collision of other vehicle which are exemplified to show the principle of the multi-dimensional space collision determination, FIG. 12 is an explanatory diagram showing a relation between the estimated collision force and the estimated velocity caused in the door closing according to the multi-dimensional space collision determining means, and FIG. 13 is an explanatory diagram showing a relation between the estimated collision force and the estimated velocity caused in assuming the side collision at a low velocity according to the multi-dimensional space collision determining means. FIG. 14 is an explanatory diagram showing a relation between the estimated collision force and the estimated velocity caused in assuming the side collision at an intermediate velocity according to the multi-dimensional space collision determining means, FIG. 15 is an explanatory diagram showing a relation between the estimated collision force and the estimated velocity caused in assuming the side collision at a high velocity according to the multi-dimensional space collision determining means and FIG. 16 is an explanatory view showing an example of setting a threshold value on a plane where the collision force is designated by the axis of abscissa and the velocity is designated by the axis of ordinate according to the multi-dimensional space collision determining means.

In FIG. 1, numeral 1 designates a vehicle collision acceleration detecting device for detecting the acceleration of a vehicle in the forward and rearward direction or the left and right direction, numeral 2 designates a collision acceleration signal that is an output signal of the vehicle collision acceleration detecting device 1, numeral 5 designates a first-order lag element type filter converting the collision acceleration signal 2 into an estimated velocity signal, numeral 6 designates the estimated velocity signal outputted by the first-order lag element type filter 5, numeral 7 designates a first-order lag element type filter converting the estimated velocity signal 6 to an estimated displacement signal, numeral 8 designates the estimated displacement signal outputted by the first-order lag element type filter 7, numeral 13 designates collision force calculating means for calculating the collision force of a vehicle by inputting the collision acceleration signal 2, the estimated velocity signal 6 and the estimated displacement signal 8 and numeral 14 designates an estimated collision force signal outputted by the collision force calculating means 13.

Numeral 15 designates a multi-dimensional space collision determining means whereby loci of variables of a plurality of signals comprising the estimated collision force signal 14, the collision acceleration signal 2, the estimated velocity signal 6 and the estimated displacement signal 8 are drawn in a multi-dimensional space constituted by these variables, whether the loci exceed threshold values previously set in the multi-dimensional space, that is, whether the coordinates in the multi-dimensional space determined by the estimated collision force signal 14, the collision acceleration signal 2, the estimated velocity signal 6 and the estimated displacement signal 8, are present at a ON region or OFF region, is determined and when the coordinates are at the ON region, a collision determining signal operating a passenger protecting device is outputted and when they are at the OFF region, the collision determining signal is not outputted.

Numeral 16 designates a controller comprising the first-order lag element type filter 5, the first-order lag element type filter 7, the collision force calculating means 13 and the multi-dimensional space collision determining means 15 and numeral 17 designates the collision determining signal outputted by the multi-dimensional space collision determining means 15 and by outputting the collision determining signal 17, a passenger protection device for protecting a passenger against impact in collision of a vehicle such as an air bag, a seat belt pretension device or the like installed in the vehicle, is operated.

Next, in FIG. 2 numeral 18 designates a vehicle equivalent mass when a model of a vehicle is formed in one degree of freedom, numeral 19 designates a vehicle equivalent damper applied on the vehicle equivalent mass 18, numeral 20 designates a vehicle equivalent spring supporting the vehicle equivalent mass 18, numeral 21 designates a collision force (f) applied on the vehicle equivalent mass 18 in collision and numeral 22 designates a vehicle equivalent displacement (x1) caused at the vehicle equivalent mass 18 when the collision force (f) 21 is applied on the one degree of freedom model comprising the vehicle equivalent mass 18, the vehicle equivalent damper 19 and the vehicle equivalent spring 20.

Next, an explanation will be given of the collision force calculating means 13 when the above-described one degree of freedom model is used in the collision force calculating means in reference to FIG. 3. Numeral 9 designates a mass coefficient multiplier multiplying the collision acceleration signal 2 that is an input by a constant value of the vehicle equivalent mass 18 and outputting the result of multiplication, numeral 10 designates a damper coefficient multiplier multiplying the estimated velocity signal 6 that is an input by a constant value of the vehicle equivalent damper 19 and outputting the result of multiplication, numeral 11 designates a spring coefficient multiplier multiplying the estimated displacement signal 8 that is an input by a constant value of the vehicle equivalent spring 20 and outputting the result of the multiplication, numeral 12 designates an adder adding output values of the mass coefficient multiplier 9, the damper coefficient multiplier 10 and the spring coefficient multiplier 11, numeral 13 designates the collision force calculating means constituted by the mass coefficient multiplier 9, the damper coefficient multiplier 10, the spring coefficient multiplier 11 and the adder 12 and numeral 14 designates an estimated collision force signal calculated as the result of calculation of the adder.

Next, an explanation will be given of the operation.

Generally, a collision force is generated in a vehicle when the vehicle collides with a hazard or the vehicle is collided by other vehicle. Collision force generated between the both bodies differs depending on the masses, the velocities, the shapes of the collision faces, the elastic moduli of the collision faces of these two bodies. For example, in the case of elastic collision which does not cause plastic deformation in materials constituting the both bodies, since, if the collision have a low collision speed or the collision does not expand an air bag, such as hammering or door closing, it is well-known that generated collision force is provided with a waveform which can be approximated by a sinusoidal half wave according to the contact theory of Hertz.

At this occasion, the degree of damage imposed on the vehicle body and a human body that is a passenger, is not measured by the maximum value Fmax of the generated collision force but the degree is considerably influenced by an integrated value of the generated collision force f(t) in respect of time t, that is, the magnitude of an impulse F·t (=integration over time of f(t)dt).

Further, when the collided wall face is hard, the maximum value Fmax of the collision force and the maximum value "a max" of the acceleration generated accompanied therewith are generally large. However, in the case where although the collided portion is hard, the collision velocity is small, the generated impulse F·t is small even if the maximum value Fmax of the collision force becomes large. The same is applicable to the case where the vehicle is knocked by a hand-held hammer or the case where the door is slammed. Although in these cases an oscillating force having the large maximum value Fmax and the large maximum acceleration "a max" is generated by the elastic collisions the impulse is small and the degree of impact on the vehicle body and the passenger is extremely small.

Meanwhile in the case where the vehicle is heavily destructed by causing plastic destruction, since, in the case of a vehement collision where the collision velocity is so fast that an air bag needs to be developed, the generated collision force is different from that in the case of elastic collision and generally, both of the maximum generated force Fmax and the impulse F·t become large. Further, in a special case of collision, for example, in a collision in which a small-sized vehicle runs under a large-sized vehicle, the elasticities of the collision faces of the both vehicles may be weak, and the maximum value Fmax of the generated collision force and maximum acceleration "a max" may be comparatively small. However, the value of the impulse F·t is extremely large since the time period of duration of the generated collision force is prolonged.

Accordingly, when the collision determination is carried out based on the collision force and the impulse, the degree of collision on the vehicle destruction and the passenger can accurately be determined even if the maximum value Fmax of the generated collision force and the maximum acceleration "a max" are comparatively small. That is, it is suitable in principle for evaluating actually the degree of influence of the impact force on the vehicle and the passenger rather to utilize the collision force applied on the vehicle and the impact that is converted from the collision force in the collision determination than to utilize directly the maximum values etc. of the acceleration or the velocity caused in the vehicle body in the collision determination.

Here, the principle of estimating the collision force in accordance with the present invention will be clarified by showing by analysis the nondestructive collision phenomenon such as a collision having a low collision velocity, hammering, door closing etc. that is elastic collision, namely, the acceleration, the velocity and the displacement caused in the vehicle in the collision where an air bag is not expanded, through the one degree of freedom model illustrated in FIG. 2. The equation of motion of the one degree of freedom model illustrated in FIG. 2 is as follows.

$$m_1\ddot{x}_1 + c_1\dot{x}_1 + k_1 x_1 = f \tag{1}$$

As shown by Equation (1), the collision force f is constituted by adding a value of (acceleration $\ddot{x}_1$) multiplied by a mass $m_1$, a value of (velocity $\dot{x}_1$) multiplied by a damping constant $c_1$ and a value of (displacement $x_1$) multiplied by a spring constant $k_1$.

FIG. 3 illustrates the relationship of the above-defined Equation (1) by a block diagram. That is, the vehicle in collision is approximated by the one degree of freedom model and pertinent constant values are set to the mass $m_1$, the damper $c_1$ and the spring $k_1$, the collision acceleration signal 2 provided by the collision acceleration detecting device 1 installed in the vehicle and the estimated velocity signal 6 and the estimated displacement signal 8 which are estimated from the collision acceleration signal 2, are multiplied thereto and the results of multiplication are added by the adder 14 whereby the estimated collision force signal 14 can be calculated.

Here, an explanation will be given of estimating the collision force f based on the detected acceleration of the vehicle in accordance with the one degree of freedom model illustrated by FIG. 2, in reference to FIGS. 4(a), 4(b), 4(c), 4(d), 5 and 6. FIGS. 4(a), 4(b), 4(c) and 4(d) illustrate results of simulation by a computer in respect of a transient vibration characteristic when specific constant values are given to the one degree of freedom model illustrated by FIG. 2. In FIGS. 4(a), 4(b), 4(c) and 4(d), numeral 30 designates a collision force waveform having a sinusoidal half wave shape having a time period of sinusoidal half wave r=5 ms and the maximum oscillating force Fmax=125 tonf that is applied on the one degree of freedom model, numeral 31 designates a vehicle equivalent acceleration waveform when the collision force waveform 30 is applied on the one degree of freedom model where constant values of a vehicle equivalent mass $m_1$=100 kg, a vehicle equivalent damper $c_1$=64 kgf·s/cm and a vehicle equivalent spring $k_1$=100 tonf/cm are given and similarly, numeral 32 designates a vehicle equivalent velocity waveform and numeral 33 designates a vehicle equivalent displacement waveform.

The only signal provided by the collision acceleration detecting device 1 in vehicle collision is the acceleration waveform 31 and the velocity waveform 32 and the displacement waveform 33 need to be estimated based on the acceleration waveform 31. Incidentally, the respective constant values are not derived from the actual values as they are such as the weight of the vehicle but are previously calculated from the vibration characteristics of the vehicle through experiment and analysis and they are an example of constant values which are calculated to constitute pertinent values when the vehicle is approximated by the one degree of freedom model.

FIG. 5 illustrates an example of the frequency response characteristic of the first-order lag element type filters illustrated by FIG. 1 which is used for estimating the velocity signal and the displacement signal from the collision acceleration signal 2. Numeral 34 designates the frequency characteristic when the time constant $T_1$ of the first-order lag element type filter 5 is given such that cut-off frequency $f_c$=2 Hz and the upper diagram indicates the gain characteristic and the lower diagram indicates the phase characteristic. Similarly, numeral 35 designates the frequency characteristic when the two stages of the first-order lag element type filter 5 and the first-order lag element type filter 7 are connected in series.

Incidentally, according to FIG. 5, the frequency characteristics in the case where the time constant $T_2$ of the first-order lag element type filter 7 is made equal to the time constant $T_1$ of the first-order lag element type filter 5, are shown. However, the time constant $T_1$ and the time constant $T_2$ may be equal or may not be equal to each other and no particular restriction is imposed thereon. The transfer characteristic $G_1(s)$ of the first-order lag element type filter 5 is given by the following Equation (2) when it is described by using the Laplacian operator s.

$$G_1(S) = \frac{T_1}{T_1 S + 1} \quad (2)$$

Further, the relationship between the time constant $T_1$ and the cut-off frequency $f_c$ is given by the following Equation (3).

$$f_c = \frac{1}{2\pi T_1} \quad (3)$$

Similarly, the transfer characteristic $G_2(s)$ when the two stages of the first-order lag element type filter 5 and the first-order lag element type filter 7 are connected in series, is given by the following Equation (4).

$$G_2(S) = \frac{T_1 T_2}{(T_1 S + 1)(T_2 S + 1)} \quad (4)$$

As illustrated in FIG. 5, the transfer characteristic $G_1(s)$ of the first-order lag element type filter 5 is provided with the characteristic of the integral 1/s at the cut-off frequency $f_c$ or more and becomes a constant value of $T_1$ when the frequency is below $f_c$. Accordingly, only high frequency components caused in collision are integrated and low frequency components caused in normal running or noise of DC drift components or the like of the acceleration sensor are not integrated and therefore, different from the case where the simple integration of 1/s is carried out, the output result is not saturated and the output of the integrator need not be reset at every constant period of time.

It is known from the phase relationship of FIG. 5 that the phase of the estimated velocity signal that is provided by integrating once the acceleration using $G_1(s)$ is retarded by 90° compared with that of the acceleration signal and the phase of the estimated displacement signal that is provided by integrating twice the acceleration using $G_2(s)$ is retarded by 180° compared with that of the acceleration signal. Therefore, when only the estimated displacement signal is used in the collision determination, the time of determination is retarded by the phase of 180° compared with the information of the acceleration signal.

Here, the estimated collision force is calculated from the acceleration signal, the estimated velocity signal and the estimated displacement signal and therefore, the above-described lag of the determination time is improved more than the case where only the estimated displacement signal is used.

Figure 4:
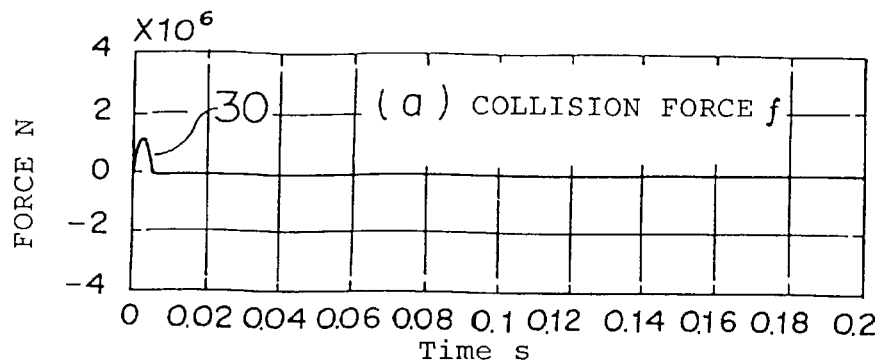
FIGS. 4($a$), 4($b$), 4($c$) and 4($d$) are explanatory diagrams showing a simulation result of time-sequential response waveforms of acceleration, velocity and displacement caused in a vehicle equivalent mass when a collision force f is applied to the mass-damper-spring model having one degree of freedom in the device of detecting collision of a vehicle according to Embodiment 1 of the present invention.
Figure 4:
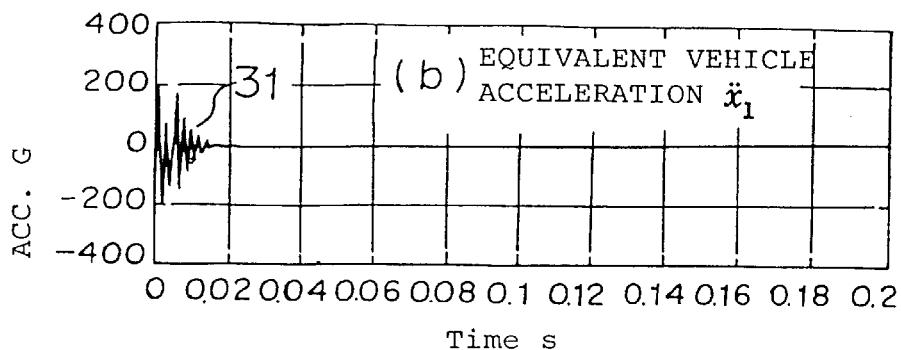
Figure 4:
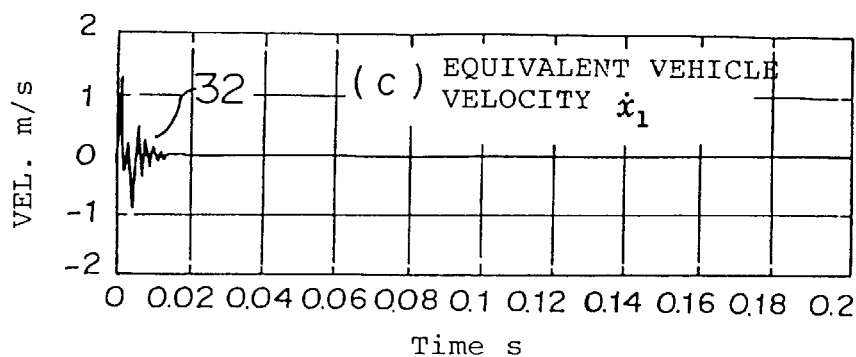
Figure 4:
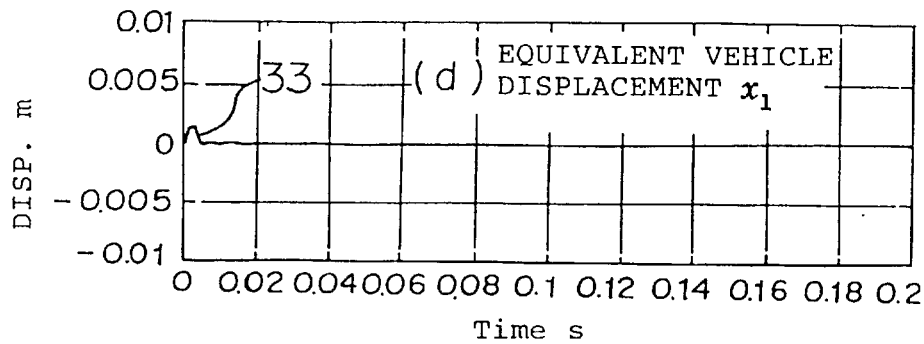

FIGS. 6(a), 6(b) and 6(c) illustrate a result of simulation of the estimated velocity and the estimated displacement in which the vehicle equivalent acceleration waveform 31 provided by the simulation illustrated by FIG. 4(b), is used, and the waveform is assumed to be the collision acceleration signal 2 caused in the vehicle in collision and the estimated velocity and the estimated displacement are provided by using the first-order lag element type filters 5 and 6 having the frequency characteristics 34 and 35 of FIG. 5.

Numeral 36 designates the estimated vehicle velocity waveform that is an output from the first-order lag element type filter 5 when the vehicle equivalent acceleration waveform 31 is inputted, numeral 37 designates the estimated vehicle displacement waveform which is an output from the two stages of the first-order lag element type filters 5 and 7 when the vehicle equivalent acceleration waveform 31 is inputted and numeral 38 designates the estimated collision force (f) which is calculated by adding the vehicle equivalent acceleration waveform 31 multiplied by the vehicle equivalent mass ($m_1$) 18 shown by FIG. 2, the estimated velocity waveform 36 multiplied by the vehicle equivalent damper ($c_1$) and the estimated displacement waveform 37 multiplied by the vehicle equivalent spring ($k_1$) 20 by the adder 12.

The estimated velocity waveform 36 and estimated displacement waveform 37 in FIGS. 6(a) and 6(b) are provided with waveforms substantially the same as those of the vehicle equivalent velocity waveform 32 and the vehicle equivalent displacement waveform 33 in FIGS. 4(c) and 4(d). Similarly, the estimated collision force (f) 38 illustrated by FIG. 6(c) is provided with a waveform substantially the same as that of the collision force waveform 30 shown by FIG. 4(a). It is known from the above-described analysis that an accurately estimated collision force can be calculated from the collision acceleration when the constant values of the one degree of freedom model approximating the vehicle are correctly given.

Next, an explanation will be given of the principle of the collision determination by showing on phase planes examples of loci in the multi-dimensional space collision determining means inside of the collision detecting device in reference to FIGS. 7, 8, 9 and 10.

Numeral 39 in FIG. 7 designates a locus that is drawn on a plane where the axis of abscissa designates the collision force waveform 30 applied on the one degree of freedom model illustrated by FIG. 4(a) and the axis of ordinate designates the vehicle equivalent velocity waveform 32 caused at that time in the vehicle equivalent mass. Numeral 40 in FIG. 8 designates a locus that is drawn on a plane where the axis of abscissa designates the estimated collision force waveform (f) 38 illustrated by FIG. 6(c) and the axis of ordinate designates the estimated velocity waveform 36 calculated by the collision force calculating means.

The locus 39 on the plane of collision force - velocity illustrated by FIG. 7 indicates a behavior of linear vibration of the one degree of freedom model in which both the velocity and the collision force increase from the origin where the collision force is 0 and the velocity is 0, successively, the velocity becomes approximately 0 at a time point where the velocity is decreased and the collision force is maximized and thereafter the velocity is changed in the negative direction and the collision force is also decreased. The collision force having a sinusoidal half wave becomes 0 at 5 ms and thereafter as illustrated by FIG. 4(a), however, a remaining vibration is caused in velocity at 5 ms and thereafter on the plane of FIG. 7 and the velocity draws straight lines having the maximum value of substantially ±0.5 m/s repeatedly and attenuatedly on a vertical line where the collision force is 0.

Meanwhile, the locus 40 on the plane of the estimated collision force - estimated velocity illustrated by FIG. 8, draws a locus substantially the same as the locus 39 on the plane of the collision force - velocity except the collision force is more or less deviated in the negative direction. It is known from these loci that the behavior in collision can sufficiently be produced by the loci on the plane and in the multi-dimensional space by using the estimated collision force signal 14 and the estimated velocity signal 6 which are calculated from the collision acceleration signal 2 through the first-order lag element type filter 5 and the collision force calculating means 13.

Generally, a value of the collision force f multiplied by the velocity x1 designates power in the dynamics and the value corresponds to an amount of heat generated per constant period of time when it is converted into a physical quantity in the thermodynamics. The value is suitable for a physical constant for evaluating the degree of influence of the impact force by collision on a human body. It is possible to determine the behavior of the collision phenomenon more characterizingly by observing the locus formed by the collision force and the velocity on the plane than by observing a relation between the collision force and time.

Numeral 41 in FIG. 9 shows a locus on a plane where the axis of abscissa designates the estimated collision force waveform (f) 38 which is calculated by the collision force calculating means of FIG. 3 and which is shown by FIG. 6(c) and the axis of ordinate designates the estimated displacement waveform 37 which is also calculated by the collision force calculating means of FIG. 3 and which is illustrated by FIG. 6(b). Similarly, numeral 42 in FIG. 10 designates a locus on a plane where the axis of abscissa designates the estimated collision force waveform (f) 38 and the axis of ordinate designates the acceleration waveform 31 corresponding to the vehicle acceleration signal 2. A further detailed collision determination can be carried out by characterizing the collision phenomenon by the locus in the multi-dimensional space where the planes of the displacement and the acceleration versus the collision force are added to the plane of the collision force - velocity.

A further specific clarification and explanation will be given of the principle of the collision determination by the collision detecting device in reference to FIGS. 11(A), 11(B), 12, 13, 14, 15 and 16. An explanation will be given of collision in expanding a side air bag as an example. FIG. 11(A) is an explanatory view showing the door closing that is an example of the collision phenomenon in which an air bag is not expanded and FIG. 11(B) is an explanatory view illustrating an example where a vehicle collides with other vehicle from side direction.

In FIGS. 11(A) and 11(B), numeral 43 designates a vehicle, numeral 44 designates a door of the vehicle 43 and numeral 45 designates a colliding vehicle which collides with the vehicle 43. When the colliding velocity of the colliding vehicle 45 from the side direction is small, an air bag is not expanded, however, when the colliding velocity is large, the air bag is expanded. Generally, the reference of collision determination is determined by the magnitude of impact force applied on a dummy doll mounted on a vehicle in collision experiments. Further, the time period of determination allowable for the air bag expansion is determined by a time period required for the dummy doll to collide with the steering wheel, glass, doors on the side faces in the vehicle and a time period required for the expansion from when an ignition signal is given to the air bag to when the air bag is expanded, or the like.

FIGS. 12 and 13 illustrate examples of planes constituted by the estimated collision force and the estimated velocity in the case where the air bag is not expanded, that is, at the OFF condition. Numeral 46 in FIG. 12 designates a locus on the plane of the estimated collision force - estimated velocity which is drawn by assuming the collision acceleration signal 2 caused in the door closing. Numeral 47 in FIG. 13 designates a locus on the plane of the estimated collision force - the estimated velocity that is drawn by assuming the collision acceleration signal 2 that is caused when other vehicle collides with the vehicle from the side direction at a low velocity.

FIGS. 14 and 15 indicate examples of planes constituted by the estimated collision force and the estimated velocity when the air bag is expanded, that is, at the ON condition. Numeral 48 in FIG. 14 designates a locus on the plane of the estimated collision force - estimated velocity that is drawn by assuming the collision acceleration signal 2 caused when other vehicle collides with a vehicle from the side direction at an intermediate velocity and numeral 49 in FIG. 15 designates a locus on the plane of the estimated collision force - estimated velocity that is drawn by assuming the collision acceleration signal 2 caused when other vehicle collides with a vehicle from the side direction at a high velocity.

FIG. 16 illustrates an example of setting a threshold value that is set on the plane of the collision force - velocity such that the collision determination of the locus 46 on the plane of FIG. 12 in door closing and the collision determination of the locus 47 on the plane of FIG. 13 in the side collision at a low velocity, become OFF and such that the collision determination of the locus 48 on the plane of FIG. 14 in the side collision at an intermediate velocity and the collision determination of the locus 49 on the plane of FIG. 15 in the side collision at a high velocity, become ON in a short period of time as short as possible. In FIG. 16 numeral 50 designates a threshold value identifying the ON region and the OFF region. According to the threshold value 50, the magnitude of the velocity in the ON/OFF determination differs by the case where the collision force is small and the case where the collision force is large. When the collision force is small, the threshold value is larger than at least the maximum estimated velocity in the door closing. When the collision force is large, the threshold value is larger than at least the maximum estimated velocity of the side collision at a low velocity where the passenger protecting device needs not to start.

Here, as is apparent from FIG. 16, when the loci are drawn on the plane and the region determination is carried out by using the threshold value 50, the loci 46 and 47 on the plane at the OFF condition and loci 48 and 49 on the plane at the ON condition can distinctly be identified.

Incidentally, although not illustrated here, it is possible to add similar determinations by threshold values also on the plane of collision force - displacement or collision force - acceleration to the determination on the plane of collision force - velocity. It goes without saying that the collision determination can be carried out more in details by using these threshold values in respect of the threshold value determination in the multi-dimensional space.

Incidentally, although in this embodiment the model of a vehicle is formed by approximating the vehicle in the one degree of freedom, the modeling of the vehicle may be carried out by a multi degree of freedom model of second order or more. Thereby, although the amount of calculation is increased, the accuracy of estimating collision force is promoted and a higher collision determination can be carried out.

Embodiment 2

In Embodiment 2 each of a vehicle and a passenger is approximated by a one degree of freedom model.

Figure 17:
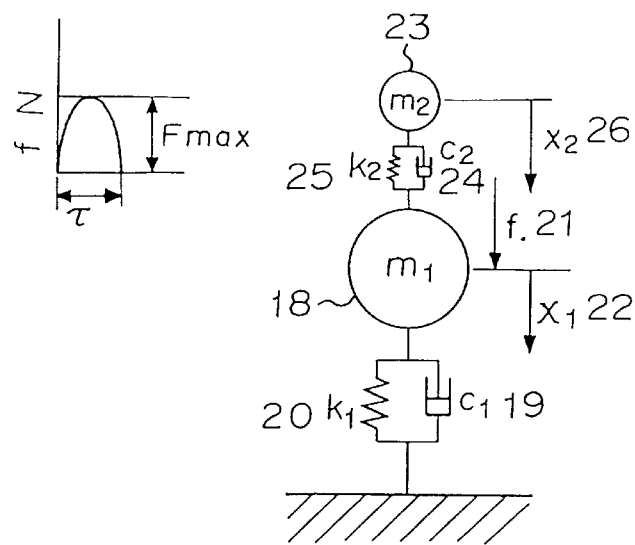
FIG. 17 is an explanatory diagram showing a one degree of freedom model simulating a vehicle and a one degree of freedom model simulating the motion of a passenger in a collision force-passenger displacement calculating means according to Embodiment 2 of the present invention.
Figure 18:
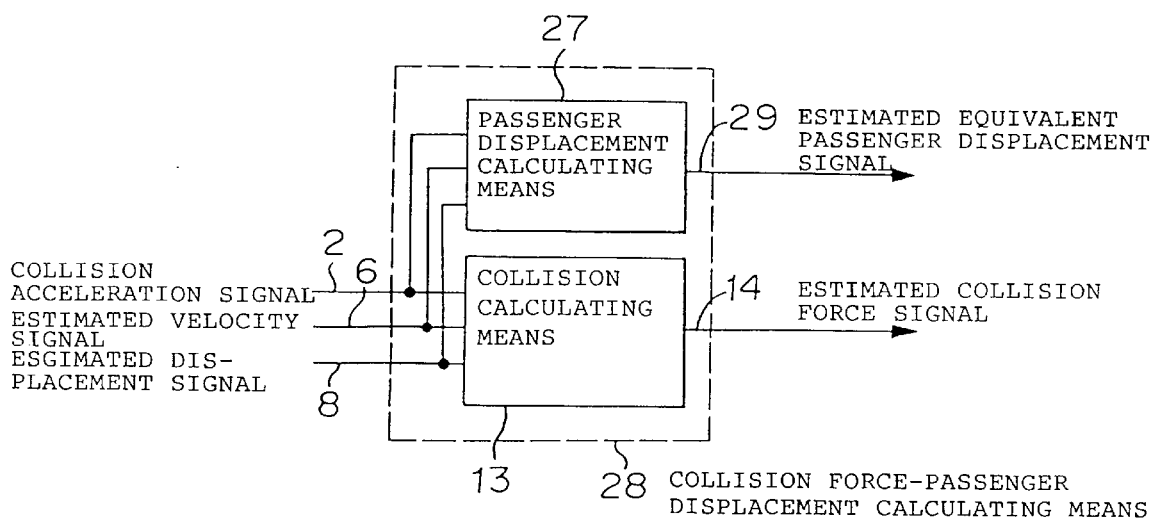
FIG. 18 is a block diagram showing an example of the collision force-passenger displacement calculating means according to Embodiment 2 of the present invention.

FIG. 17 is an explanatory view showing a one degree of freedom model simulating a vehicle and a one degree of freedom model simulating the motion of a passenger in a collision force - passenger displacement calculating means in Embodiment 2 and FIG. 18 is a block diagram showing an example of the collision force - passenger displacement calculating means.

In these drawings portions having constitutions similar to those in Embodiment 1 are attached with the same notations and an explanation thereof will be omitted.

In FIG. 17, numeral 23 designates a passenger equivalent mass m2 when a passenger riding on a vehicle is simulated by a one degree of freedom model, numeral 24 designates a passenger equivalent damper c2, numeral 25 designates a passenger equivalent spring k2 and numeral 26 designates a passenger equivalent displacement x2. Incidentally, the vehicle is simulated by the one degree of freedom model similar to the model of the vehicle illustrated in FIG. 2. In FIG. 18 numeral 27 designates a passenger displacement calculating means for calculating the displacement of the passenger based on the collision acceleration signal 2, the estimated velocity signal 6 and the estimated displacement signal 8, numeral 28 designates a collision force - passenger displacement calculating means which combines the collision force calculating means similar to the collision force calculating means shown in FIG. 1 and the passenger displacement calculating means 27 and numeral 29 designates an estimated equivalent passenger displacement signal outputted from the collision force - passenger displacement calculating means 28 and the estimated collision force 14 is also outputted from the collision force - passenger displacement calculating means 28, similarly.

Next, an explanation will be given of the operation.

The equations of motion when the vehicle and the passenger are respectively represented by the models in one degree of freedom as shown by FIG. 17, are given by the following Equation (5).

$$m_1\ddot{x}_1+c_1\dot{x}_1+c_2(\dot{x}_1-\dot{x}_2)+k_1x_1+k_2(x_1-x_2)=f\ m_2\ddot{x}_2+c_2(\dot{x}_2-\dot{x}_1)+k_2(x_2-x_1)=0 \quad (5)$$

In the above-described equations the acceleration $\ddot{x}_1$ of the vehicle is measured and given by the acceleration detecting device 1 and accordingly, a transfer function $G_3(s)$ representing a relation in a relative displacement $(x_2-x_1)$ between the passenger and the vehicle, and the acceleration $\ddot{x}_1$ of the vehicle is calculated from the second equation of Equation (5) as shown by the following Equation (6).

$$G_3(S) = \frac{(x_2 - x_1)}{x_1 S^2} = \frac{-m_2}{m_2 S^2 + c_2 S + k_2} \quad (6)$$

It is known from Equation (6) that when the acceleration $\ddot{x}_1$ of the vehicle is given to $G_3(s)$ as an input, the relative displacement $(x_2-x_1)$ between the passenger and the vehicle is provided as an output. Meanwhile, the collision force f applied on the vehicle can be calculated from the acceleration $\ddot{x}_1$ for the vehicle similar to the case of Equation (1) by assuming that values of the mass, the damper and the spring of the passenger are sufficiently smaller than those values of the vehicle ($m_2<<m_1$, $c_2c<<c_1$, $k_2<<k_1$) in the first equation of Equation (5).

Although not illustrated here, when the relative displacement $(x_2-x_1)$ between the passenger and the vehicle calculated from the relation of Equation (6) is added as one of signals for the multi-dimensional space collision determining means 15, a new locus which can be used in the collision determination can be drawn in the multi-dimensional space whereby more detailed and finer collision determination can be carried out.

Incidentally, although the passenger is represented by the model having one degree of freedom here, the passenger may be represented by a model having a multi degrees of freedom of second order or more. It goes without saying that although the amount of calculation is increased thereby, the estimation of the amount of displacement is improved and a higher collision determination can be carried out.

Embodiment 3

In Embodiment 3, the passenger protecting device is prevented from operating in the case of a nondestructive collision, in addition to the threshold value set in the above-described Embodiment 1 shown by FIG. 16

Figure 19:
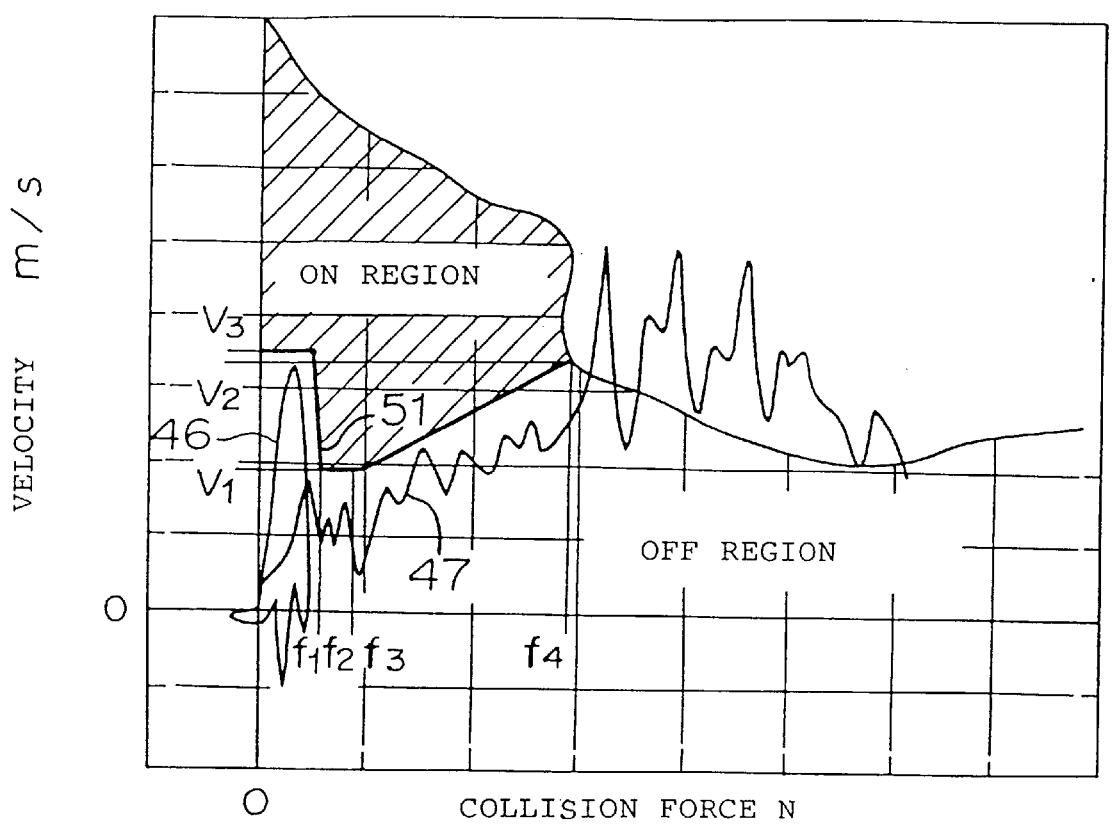
FIG. 19 is an explanatory diagram showing an example of setting a threshold value determining a nondestructive collision in a plane where the collision force of the multi-dimensional space collision determining means is designated by the axis of abscissa and the velocity thereof is designated by the axis of ordinate in the device of detecting collision of a vehicle according to Embodiment 3 of the present invention.

FIG. 19 is an explanatory view showing an example of setting a threshold value for determining a nondestructive collision on a plane where the axis of abscissa designates the collision force derived from the multi-dimensional space collision determining means in the collision detecting device of a vehicle in accordance with Embodiment 3 and the axis of ordinate designates the velocity. Incidentally, portions having constitutions similar to those in Embodiment 1 and Embodiment 2 are attached with the same notations and an explanation thereof will be omitted.

In FIG. 19 numeral 51 designates an example of a threshold value for determining a nondestructive collision which is set on a plane where the axis of abscissa designates the collision force and the axis of ordinate designates the velocity, that is one of two-dimensional spaces provided by selecting one plane from the multi-dimensional space of the multi-dimensional space collision determining means 15, in order to differentiate the collision acceleration signal 2 by door closing or hammering under the OFF condition from the collision acceleration signal 2 under the ON condition. Incidentally, in FIG. 19 regions which do not directly relate to this embodiment are partially omitted.

Next, an explanation will be given of the operation.

As illustrated in FIG. 7, FIG. 8 and FIG. 12 in Embodiment 1, in the case of the elastic collision such as door closing or hammering by which plastic deformation is not caused, although the collision force does not become a certain value or more, large acceleration and velocity may be caused since hard objects collides with each other and in this case a locus of the collision force in a semicircular arc shape that is convex to the upward direction is drawn as in the locus 46 of FIG. 19. Meanwhile, when other vehicle collides with a side face of a vehicle at a low velocity, although large acceleration and velocity are not caused instantaneously, the finally caused collision force becomes larger than the value in the case of door closing and, for example, the locus 47 of FIG. 19, since, for example, soft and thin steel plate constituting the outer structure of the door portion is dented.

In order to determine both of the two kinds of collision as under the OFF condition, the following threshold value is specified whereby the collision determination under the ON condition can be carried out in a time period shorter than that by the threshold value 50 of FIG. 16.

On the plane of the collision force and the velocity, (i) the velocity is maintained at a constant value ($v_3$) between collision force O and a collision force ($f_1$), (ii) the velocity is linearly decreased between the first collision force ($f_1$) and a second collision force ($f_2$), (iii) the velocity is maintained at a constant value ($v_1$) between the second collision force ($f_2$) and a third collision force ($f_3$) and (iv) the velocity is increased linearly between the third collision force ($f_3$) and a fourth collision force ($f_4$).

Embodiment 4

According to Embodiment 4 the threshold value is set such that a two-stage collision can be determined.

Figure 20:
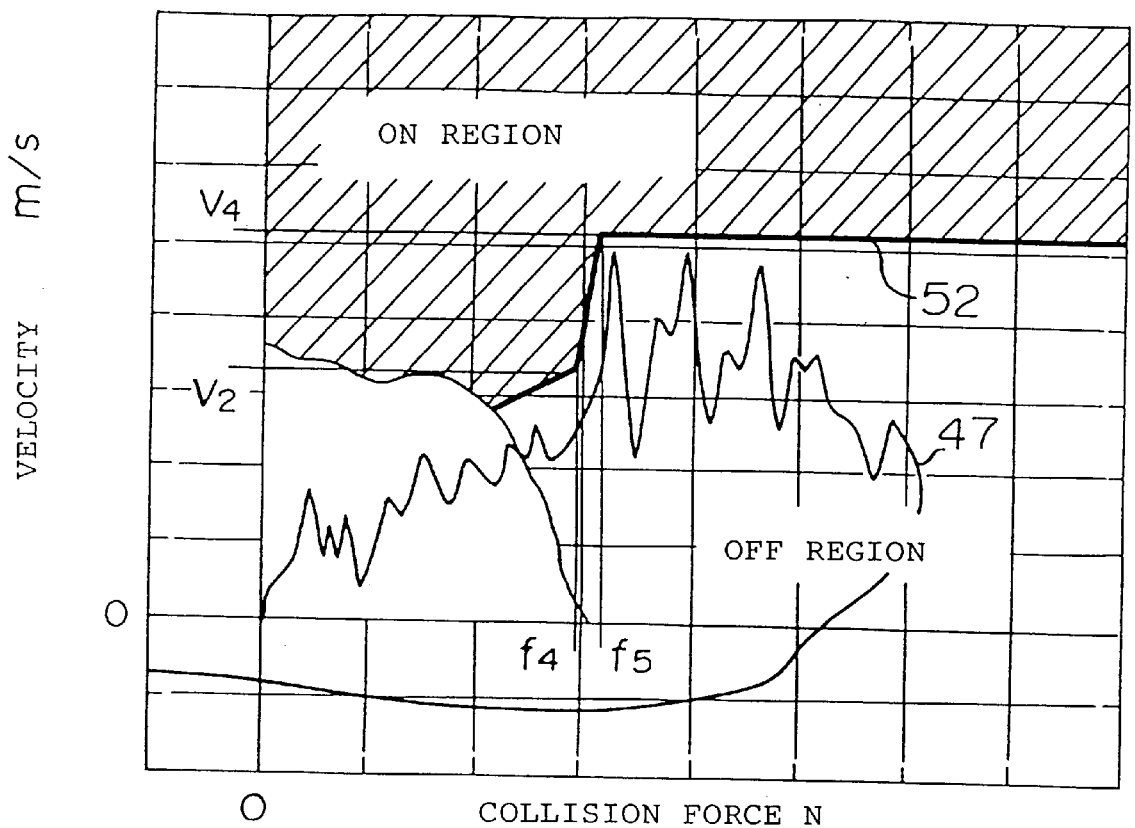
FIG. 20 is an explanatory diagram showing an example of setting a threshold value determining a two-stage collision in a plane where the collision force of the multi-dimensional space collision determining means is designated by the axis of abscissa and the velocity thereof is designated by the axis of ordinate in the device of detecting collision of a vehicle of Embodiment 4 of the present invention.

FIG. 20 is an explanatory diagram showing an example of the threshold setting for determining a two-stage collision on a plane where the axis of abscissa designates the collision force derived from the multi-dimensional space collision determining means in the collision detecting device of a vehicle according to Embodiment 4 and the axis of ordinate designates the velocity derived therefrom. Incidentally, portions having constitutions similar to those in the above-described respective embodiments are attached with the same notations and an explanation thereof will be omitted.

In FIG. 20, numeral 52 designates an example of a threshold value for determining a two-stage collision that is set on a plane where the axis of abscissa designates the collision force and the axis of ordinate designates the velocity, that is one of two-dimensional spaces provided by selecting one plane from the multi-dimensional space of the multi-dimensional space collision determining means 15, in order to differentiate the collision acceleration signal 2 under the OFF condition identifying the two-stage collision in which after a vehicle firstly collide with a soft portion of the vehicle having low rigidity such as thin steel plate at a door portion or bumper whereby the impact force is alleviated, the collision is further progressed to a hard portion having high rigidity such as the frame of the vehicle, from the collision acceleration signal under the ON condition. Incidentally, regions which do not directly relates to the embodiment are partially omitted in FIG. 20.

Next, an explanation will be given of the operation.

When, for example, other vehicle collides with a side face of a vehicle at a low velocity, although large acceleration and velocity are not caused instantaneously since soft and thin steel plate constituting the outer structure of the door portion is dented, the finally caused collision force becomes larger than the value in the case of door closing, and draws, for example, a locus 47 in FIG. 20. When the collision destruction of the soft portion is progressed to a certain range or more, the plastic destruction reaches finally hard portions of the vehicle having high rigidity such as the frame and the collision force draws a locus in which the generated acceleration and velocity are instantaneously increased although the collision force is not large at a time point where the collision force exceeds a collision force ($f_4$) as in the locus 47 of FIG. 20, which is similar to the plane of door closing according to Embodiment 3.

In order to firmly determine the collision as the OFF condition and to determine swiftly the acceleration signal under the ON condition the following threshold is added to the threshold value of Embodiment 3 on the plane of the collision force and the velocity whereby the collision under the ON condition and the collision under the OFF condition can distinctly be differentiated and erroneous operation caused by the two-stage collision can be prevented even if the two-stage collision is caused.

According to threshold value, (i) the velocity is linearly increased between the third collision force ($f_3$) and the fourth collision force ($f_4$), (ii) the velocity is linearly increased between the fourth collision force ($f_4$) and a fifth collision force ($f_5$) by an inclination several times steeper than the inclination between the third collision force ($f_3$) and the fourth collision force ($f_4$), and (iii) the velocity is maintained at a constant value ($v_4$) for the collision force larger than the fifth collision force ($f_5$).

Embodiment 5

According to Embodiment 5, an explanation will be given of positions of attaching acceleration detecting devices in a vehicle and of using a plurality of acceleration detecting devices in combination.

Figure 21A:
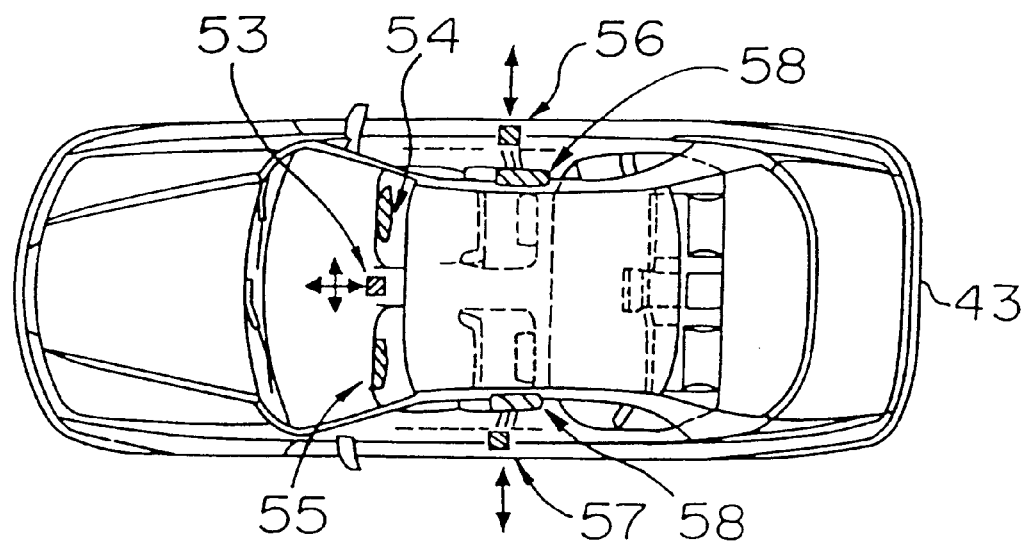
FIGS. 21(a) and 21(b) are explanatory views showing a vehicle in which a vehicle collision acceleration detecting device is installed such that collision accelerations in the forward and rearward direction and in the side direction can be detected, in a device of detecting collision of a vehicle according to Embodiment 5 of the present invention.
Figure 21B:
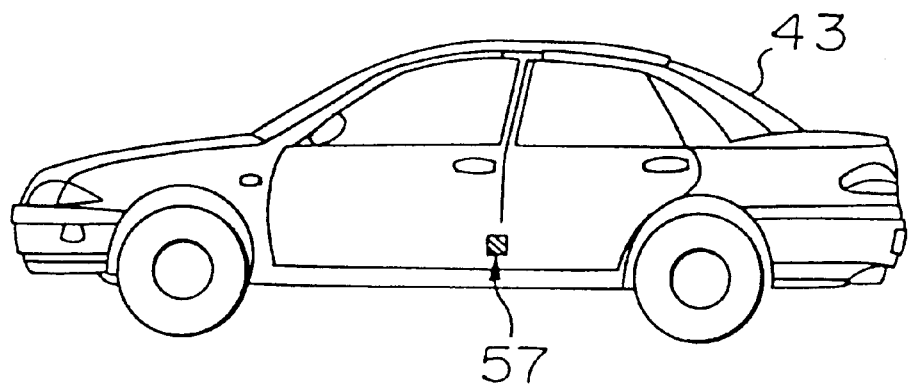

FIGS. 21(*a*) and 21(*b*) are explanatory views showing a vehicle in which a vehicle collision acceleration detecting device is installed such that collision accelerations in the forward and rearward direction and the side direction can be detected in accordance with a collision detecting device of a vehicle of Embodiment 5. Incidentally, portions having constitutions the same as those of the above-described respective embodiments are attached with the same notations and an explanation thereof will be omitted.

FIGS. 21(*a*) and 21(*b*) illustrate a top view and a side view of a vehicle, respectively, where numeral 53 designates a front acceleration detecting device which is installed at the forward center portion of a vehicle 43 for detecting accelerations in two axes directions of the front and rear direction and the side direction, numeral 54 designates a front air bag installed at the driver's seat of the vehicle which performs the collision determination based on the collision acceleration signal 2 from the front acceleration detecting device 53 and is expanded based on the collision determining signal 17 and numeral 55 designates a front air bag installed at an assistant driver's seat.

Numeral 56 designates a side direction acceleration detecting device on the side of the driver's seat which is attached on the side face of the vehicle 43 on the driver's seat side for detecting the acceleration of the vehicle in the side direction, numeral 57 designates a side direction acceleration detecting device on the assistant driver's seat side which is attached on the assistant driver's seat side similarly and numeral 58 designates side air bags which carry out the collision determination based on the collision acceleration signals 2 from the side direction acceleration detecting device 56 on the driver's side and the side direction acceleration detecting device 57 on the assistant driver's side and are expanded based on the collision determining signal 17.

Next, an explanation will be given of the operation.

As illustrated in FIGS. 21(*a*) and 21(*b*), by using the three acceleration detecting devices of the front acceleration detecting device 53 for detecting the accelerations in the two axes directions of the forward and rearward directions and the side direction, the side direction acceleration detecting device 56 on the driver's seat side and the side direction acceleration detecting device 57 on the assistant driver's seat side in combination, the collision accelerations in all the directions such as the side collision, the oblique collision, the front collision, the rear collision and the like, can accurately be measured.

Further, the plurality of collision acceleration signals are used in the controller described in Embodiments 1 2, 3 and 4 and converted into the estimated velocity signal 6 and the estimated displacement signal 8 by the first-order lag element type filters 5 and 7 inside of the controller, whereby the collision force in the forward and rearward direction and the collision force in the side direction are calculated by the collision force calculating means 13 and the collision determination is carried out by the multi-dimensional space collision determining means by all the signals in combination whereby the determination of expansion of the front air bag 54, the front air bag 55 on the assistant driver's seat side and the side air bags 58 can be carried out pertinently in correspondence with the collisions from all the directions such as the side collision, the oblique collision, the front collision, the rear collision and the like.

Also, the protection of the passenger in accordance with the collision direction can be carried out by expanding the front air bag 54, the front air bag 55 on the assistant driver's seat side and the side air bags 58 in combination.

Embodiment 6

According to Embodiment 6 a portion of the controller is constituted by using an analog calculator.

Figure 22:
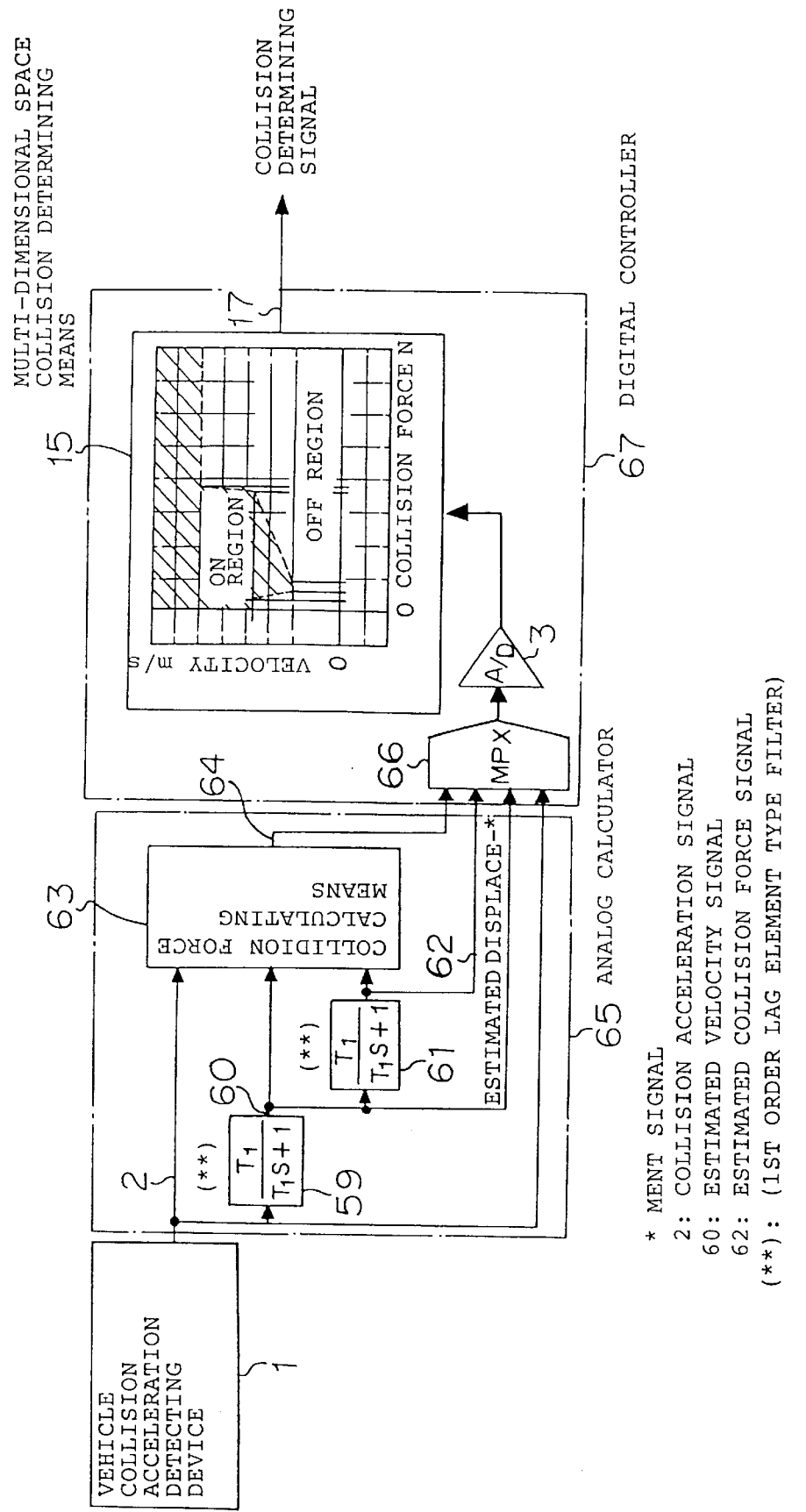
FIG. 22 is a block diagram of a device of detecting collision of a vehicle according to Embodiment 6 of the present invention.

FIG. 22 is a block diagram of a device of detecting collision of a vehicle in accordance with Embodiment 6. Incidentally, portions having constitutions the same as those in the above-described respective embodiments are attached with the same notations and an explanation thereof will be omitted.

In FIG. 22 numeral 59 designates a first-order lag element constituted by analog elements, numeral 60 designates an estimated velocity signal that is an output from the first-order lag element 59 when the collision acceleration signal 2 is inputted, numeral 61 designates a first-order lag element constituted by analog elements, numeral 62 designates an estimated displacement signal that is an output from the first-order lag element 61 when the estimated velocity signal 60 is inputted, numeral 63 designates a collision force calculating means, numeral 64 designates an estimated collision force signal that is an output from the collision force calculating means 63, numeral 65 designates an analog calculator constituted by the aggregations of the above-described analog elements, numeral 66 designates a multiplexer inputting a plurality of analog signals of the collision acceleration signal 2, the estimated velocity signal 60, the estimated displacement signal 62 and the estimated collision force signal 64 and numeral 67 designates a digital controller including the multiplexer 65, an A/D converter 3 and the multi-dimensional space collision determining means 15.

Next, an explanation will be given of the operation.

The first-order lag element type filter 59 having the characteristic of Equation (2) for providing the estimated velocity signal from the collision acceleration signal 2, is constituted by analog elements of one operational amplifier, resistors and condensers in combination. Similarly, the first-order lag element type filter 61 may also be constituted by analog elements only. Similarly, when the collision force calculating means 13 is constituted by the one degree of freedom model as illustrated in FIG. 3, the multipliers and the adder can be constituted by the above-described operational amplifiers, condensers and resistors and therefore, it can be constituted only by analog elements as the collision force calculating means 63.

The estimated velocity signal 60, the estimated displacement signal 62 and the estimated collision force signal 64 are calculated from the collision acceleration signal 2 by analog elements in this way, these signals are inputted to the A/D converter 3 via the multiplexer 66 provided in the digital controller and the collision determination is carried out by the multi-dimensional space collision determining 15 included in the digital controller 67 whereby the collision determining signal 17 is outputted.

Generally, when a higher order filter is constituted by a digital calculator, especially when an integrating operation in a high frequency region is included in the operation of the calculator, the sampling period of data needs to accelerate and the period of control calculation of the digital controller needs to accelerate in accordance therewith. However, the calculating speed can be increased by constituting the first-order lag element type filters 59 and 61 and the collision force calculating means 63 by the analog calculator 65 as described above whereby the calculating speed can be accelerated and a collision detecting device excellent in the fast response performance can be constituted without using an expensive digital CPU having a fast calculating speed.

Embodiment 7

Although the analog calculator is used at a portion of the controller according to the above-described Embodiment 6, in Embodiment 7 the controller is constituted by digital elements.

Figure 23:
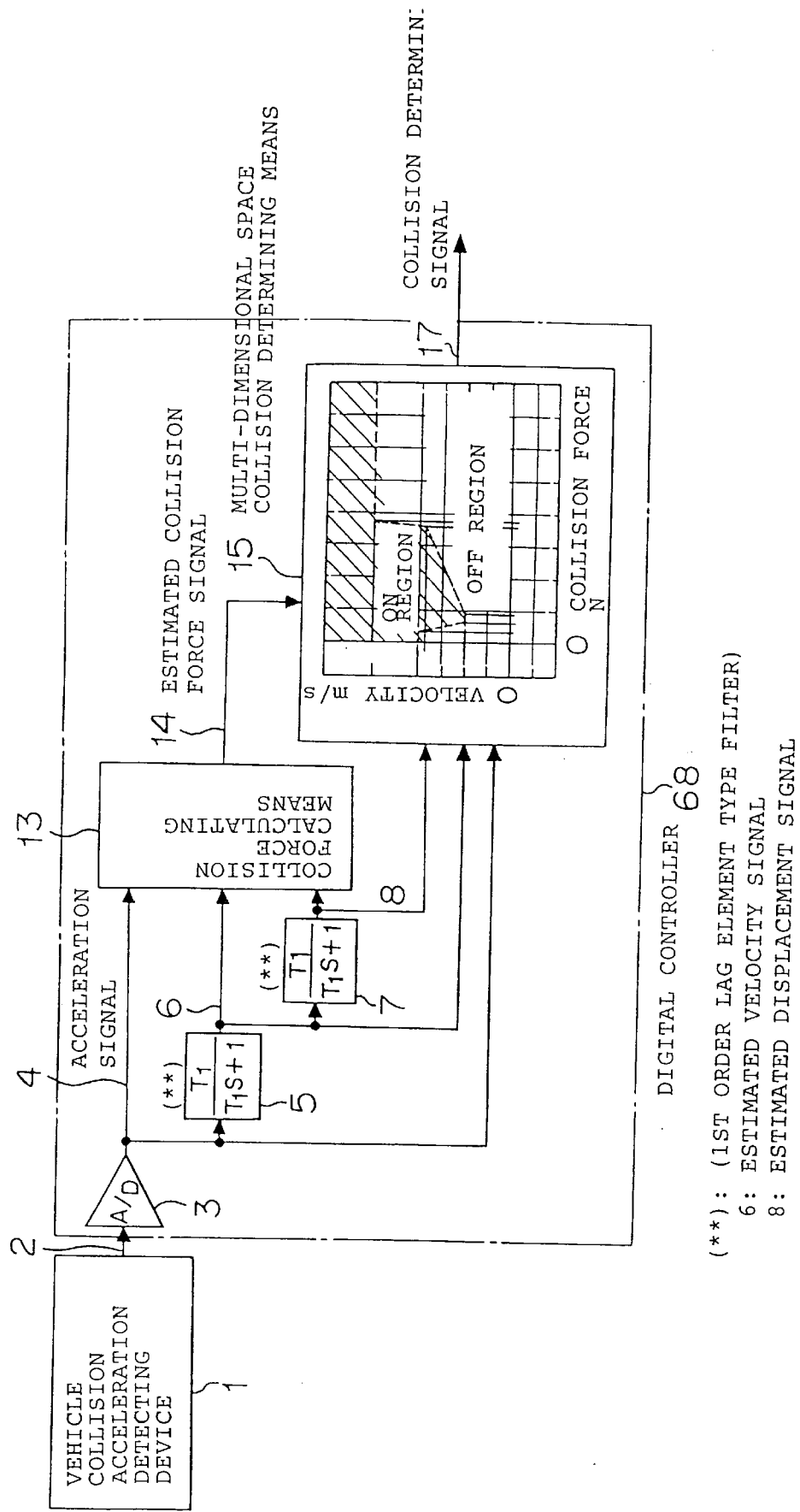
FIG. 23 is a block diagram of a device of detecting collision of a vehicle according to Embodiment 7 of the present invention.
Figure 24:
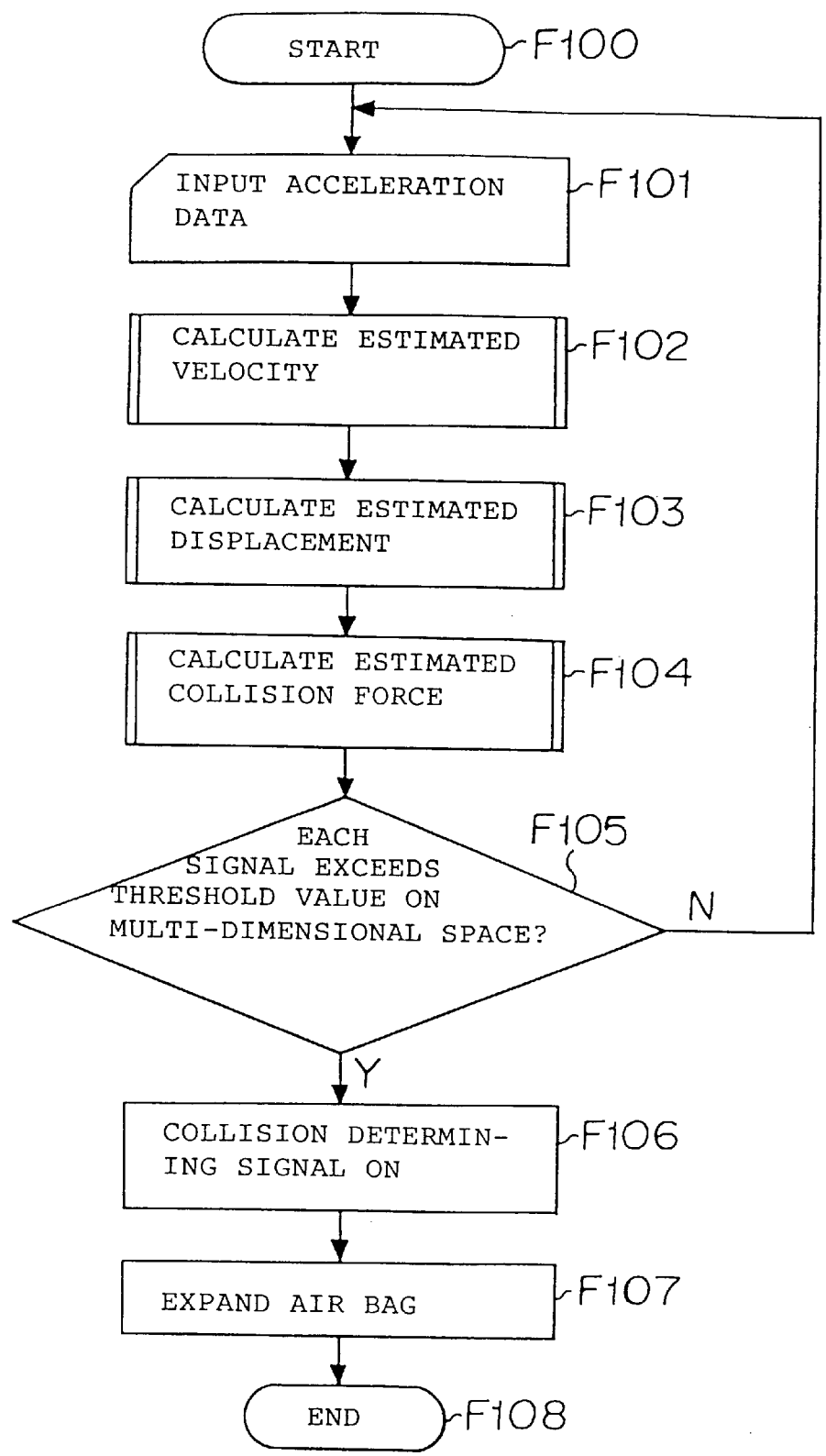
FIG. 24 is a flowchart showing an example of main control of calculation processing in the device of detecting collision of a vehicle according to Embodiment 7 of the present invention.
Figure 25:
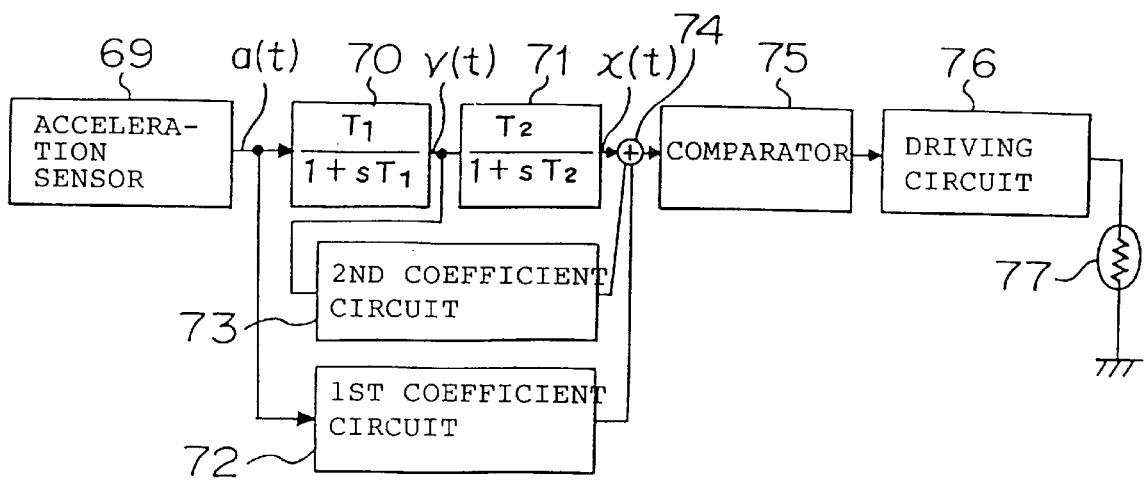
FIG. 25 is a block diagram showing a method of driving a conventional passenger protecting device for a vehicle.
Figure 26:
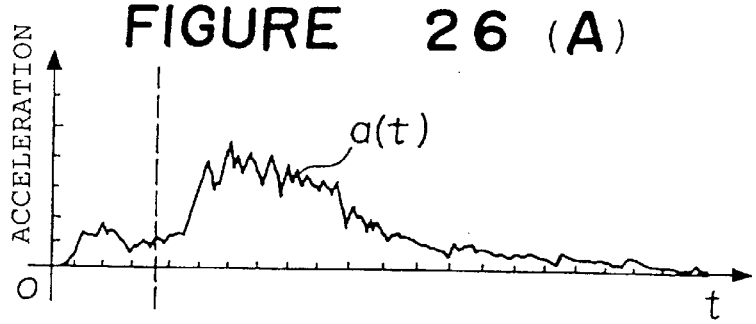
FIGS. 26(A) and 26(B) are explanatory diagrams showing an output waveform diagram indicating a detected output of an acceleration sensor and an amount of displacement in collision which are provided by a method of driving the conventional passenger protecting device for a vehicle.
Figure 26:
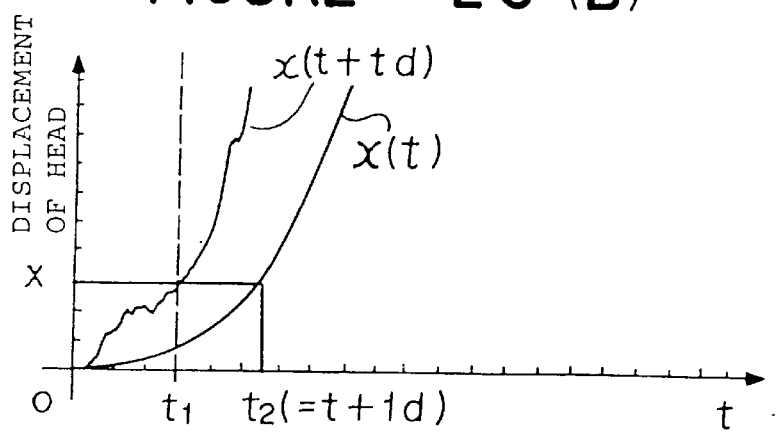

FIG. 23 is a block diagram showing a device of detecting collision of a vehicle in accordance with Embodiment 7 and FIG. 24 is a flowchart showing an example of the main control of calculation processing in the collision detecting device. Incidentally, portions having constitutions the same as those in the above-described respective embodiments are attached with the same notations and an explanation thereof will be omitted.

In these drawings, numeral 68 designates a digital controller constituted by a single digital calculator (CPU) aggregating the above-described first-order lag element type filters 5 and 7 and the collision force calculating means 13 and including the A/D converter 3. Here, although when the controller is constituted by a digital calculator, the sampling period at a high speed is required, the development of digital calculation elements is remarkable in recent years, the calculating speed is accelerated year by year and the cost is rapidly reduced. Therefore, the controller can be constituted by digital calculation elements by utilizing the digital calculating elements where calculation is carried out at a high speed and at a low cost.

Next, an explanation will be given of the procedure processed by the digital controller 68 illustrated by FIG. 23 in accordance with the flowchart illustrated by FIG. 24 as the operation of Embodiment 7.

Firstly, the operation is started at processing F100. At processing F101, the acceleration signal 2 from the vehicle collision acceleration detecting device 1 is inputted to the digital controller 68 via the A/D converter 3 as an acceleration signal 4 which is a digital value converted from the acceleration signal 2 in accordance with a predetermined sampling time T. The estimated velocity signal 6 is calculated from the acceleration signal 4 by an estimated velocity calculation routine that is constituted as a digital filter, at processing F102.

Similarly, the estimated displacement signal 8 is calculated from the estimated velocity signal 6 by an estimated displacement calculation routine that is constituted as a digital filter, at processing F103. The estimated collision force signal 14 is calculated by multiplying the acceleration signal 4, the estimated velocity signal 6 and the estimated displacement signal 8 by predetermined respective constant values of the one degree of freedom model modeling the vehicle body and adding the result of multiplication in accordance with an estimated collision force calculating routine, at processing F104. A determination is carried out at processing F105 with respect to whether a locus in the multi-dimensional space that is drawn by the acceleration signal 4, the estimated velocity signal 6, the estimated displacement signal 8 and the estimated collision force signal 14 provided by the above-described calculation processing routines, exceeds a threshold value of the multi-dimensional space collision determining means 15. If the determination at processing F105 is YES, the operation proceeds to processing F106 where the collision determining signal 17 is made ON, air bags are expanded at processing F107 and the operation is finished at processing F108.

Meanwhile, if the determination at processing F105 is NO, the operation returns to processing F101 where the acceleration data is inputted repeatedly and similar processings are repeated, Incidentally, the respective calculation processing routines at F102, F103 and F104 are illustrated as they are connected in series according to the flowchart of FIG. 24. However, these processing routines may be processed in parallel when CPU constituting the digital controller is provided with a multiple interruption processing function such as timer interruption.

As described above, according to the embodiment the total of the controller can be constituted by digital elements and the above-mentioned softwares. Accordingly, the noise resistance which is the problem in analog elements is improved. Further, the number of parts can significantly be reduced and therefore, occurrence frequency of erroneous operation due to malfunction of elements is reduced whereby the reliability of the collision determination can be promoted.

Additionally, in the above-described respective embodiments, air bags may be expanded when an ignition current is supplied to an ignition device by the collision determining signal, or a seat belt tightening device may be operated.

As described above, the respective embodiments can correspond to various collision modes of a vehicle and can carry out highly reliable collision determination in a shorter period of time by clearly coping with the set constant values which are determined by the physical model of a vehicle and further providing finely defined threshold values adopting the concept of the multi-dimensional space, whereby the collision detecting device of a vehicle is applicable not only to the determination in expanding air bags in the front collision or oblique collision but the determination in expanding side air bags in the collision from the side direction.

According to the above-described respective embodiments, the collision acceleration signal 2 from the device 1 for detecting the collision acceleration of a vehicle, is inputted to the controller 16. The controller is provided with the first-order lag element type filter 5 calculating the estimated velocity signal 6 from the acceleration signal 2, the first-order lag element type filter 7 calculating the estimated displacement signal 8 from the estimated velocity signal 6, the collision force calculating means 13 calculating the estimated collision force signal 14 generated in collision of the vehicle, from the collision acceleration signal 2, the estimated velocity signal 6 and the estimated displacement signal 8 and the multi-dimensional space collision determining means 15 for drawing a locus in the multi-dimensional space based on the above-calculated signals (the collision acceleration signal 2, the estimated velocity signal 6, the estimated displacement signal 8 and the estimated collision force signal 14) and determining whether the locus exceeds a threshold value that is previously set in the multi-dimensional space. The collision determining signal 17 outputted from the multi-dimensional space collision determining means 16 is the air bag expanding signal whereby air bags are developed and a passenger is safely protected against impact in collision of the vehicle.

Especially, an air bag can be expanded by determining the necessity of expanding the air bag in a shorter period of time and with high reliability, when a vehicle is brought into collision or collided by other vehicle and therefore, a passenger can be protected safely against collision accident.

The following invention is also described in the respective embodiments.

The collision detecting device of a vehicle is provided with the collision acceleration detecting device for detecting the collision acceleration of a vehicle, the first-order lag element type filter for calculating the estimated velocity signal, the first-order lag element type filter for calculating the estimated displacement signal from the estimated velocity signal, the collision force calculating means for calculating the estimated collision force signal generated in a vehicle in collision from the collision acceleration signal, the estimated velocity signal and the estimated displacement signal and the multi-dimensional space collision determining means for drawing a locus in the multi-dimensional space based on a plurality of signals comprising the above-calculated estimated collision force signal, the acceleration signal, the estimated velocity signal and the estimated displacement signal and outputting the collision determining signal when it is determined that the locus exceeds a threshold value that is set previously in the multi-dimensional space. Thereby, the collision acceleration of the vehicle is detected by the vehicle collision acceleration detecting device, the estimated velocity signal is calculated from the collision acceleration of the vehicle by the first-order lag element type filter, the estimated displacement signal is calculated from the estimated velocity signal by the first-order lag element type filter, the estimated collision force signal generated in collision of the vehicle is calculated from the collision acceleration signal, the estimated velocity signal and the estimated displacement signal by the collision force calculating means and the collision determination is carried out based on the estimated collision force signal. Therefore, the highly reliable collision determination having excellent physical correspondence with impact force applied on a human body can be carried out. Further, since the locus is drawn in the multi-dimensional space based on the plurality of signals comprising the collision force signal, the acceleration signal, the estimated velocity signal and the estimated displacement signal, the motion of the vehicle can be represented with detailed characterization and the highly reliable collision determination can be carried out in a short period of time with respect to various collision modes by using the collision determination finely defined by the threshold value that is previously set in the multi-dimensional space. Further, the estimated velocity signal and the estimated displacement signal are calculated from the collision acceleration of the vehicle by the first-order lag element type filters, the collision force in collision of the vehicle is estimated by inputting the signals to the collision force calculating means and the collision determination is carried out when the locus that is drawn inside of the multi-dimensional space collision determining means based on these signals (estimated collision force, acceleration signal, estimated velocity signal, estimated displacement signal), exceeds a predetermined threshold value and therefore, the highly reliable collision determination signal with a short time period of determination can be constituted.

The collision detecting device of a vehicle is provided with the collision force calculating means for inputting the acceleration signal, the velocity signal and the displacement signal and outputting the estimated collision force signal by using the one degree of freedom model comprising mass, damper and spring for calculating the collision force by simulating the motion of the vehicle, as an inner model of the multi-dimensional collision determining means. The one degree of freedom model comprising mass, damper and spring, which approximates in the first order the physical model of the vehicle as the inner model of the collision force calculating means for outputting the estimated collision signal. Therefore, the collision force can be estimated by a calculating procedure having a small amount of calculation where multiplication is performed by three times of (acceleration×vehicle equivalent mass), (estimated velocity×vehicle equivalent damper) and (estimated displacement×vehicle equivalent spring) and adding operation adding the result of multiplication is carried out twice and therefore, the calculation can be performed sufficiently by a calculator having a low calculating capacity. Further, the estimated region force that is calculated, is a signal having a small amount of time delay with advanced phase information compared with the displacement signal by which the collision determination can be carried out in a shorter period of time and the highly reliable collision determination can be carried out since the determination corresponds physically to impact force applied on human body. Further, the one degree of freedom model comprising mass, damper and spring for calculating the collision force by simulating the motion of the vehicle is used as the inner model of the collision force calculating means and therefore, the collision force actually influencing on a passenger can be calculated whereby the reliability of the collision determination can be improved. Furthermore, the collision force can be estimated by the simplified one degree of freedom model and therefore, the amount of calculation required for estimating the collision force can be reduced and the device can also be constituted by analog calculation elements.

Further, the device of detecting collision of a vehicle is provided with the collision force - passenger displacement calculating means for inputting the acceleration signal, the velocity signal and the displacement signal and outputting the estimated collision force signal and the displacement signal of a passenger in respect of an air bag on the basis of the multi-degree of freedom model in which the simulation of the motion of the passenger is added to the one degree of freedom model simulating the vehicle as the inner model of the multi-dimensional space collision determining means. Therefore, according to the multi degree of freedom model in which the simulation of the motion of the passenger is added to the one degree of freedom model simulating the vehicle as the inner model of the collision force calculating means, the relative displacement of the passenger in respect of an air bag is calculated and therefore, in addition to the impact force applied on the passenger, a relation between a time period until the passenger collides with the air bag and the displacement thereof can be included to the information of the collision determination whereby the collision determination having higher accuracy can be carried out. The device is constituted by the multi degree of freedom model in which the simulation of the motion of the passenger is added to the one degree of freedom model simulating the vehicle as the inner model of the collision force calculation and accordingly, the estimated relative displacement of the passenger in respect of the air bag can be calculated and when the collision determination is carried out by the multi-dimensional space collision determining means in which the relative displacement is added as one of signals, the collision determination with higher accuracy, with high reliability and in which the time period of determination is shortened, can be conducted.

The threshold value of the multi-dimensional space determining means is a threshold value having a function of identifying nondestructive collision such as door closing or hammering on a plane where the axis of abscissa designates the collision force and the axis of ordinate designates the velocity, that is one of two-dimensional spaces provided by taking out one plane from the multi-dimensional space of the multi-dimensional space collision determining means. Therefore, erroneous operation such as expanding air bags by erroneously identifying the nondestructive collision such as door closing can be prevented by providing the threshold value having the function of identifying the nondestructive collision such as door closing or hammering on a plane where the axis of abscissa designates the collision force and the axis of ordinate designates the velocity, that is one of two-dimensional spaces provided by taking out one plane from the multi-dimensional space of the multi-dimensional space collision determining means. Further, owing to the constitution in which the threshold value is provided with the function of identifying the nondestructive collision such as door closing or hammering on a plane where the axis of abscissa designates the collision force and the axis of ordinate designates the velocity, that is one of two-dimensional spaces provided by taking out one plane from the multi-dimensional space of the multi-dimensional space collision determining means and accordingly, erroneous operation expanding air bags unpreparedly in collision under the OFF condition, is prevented and the air bag can be expanded in a short period of time in collision under the ON condition.

The threshold value of the multi-dimensional space determining means is a threshold value having the function of identifying the two-stage collision in which the collision is initiated at a portion of the vehicle which is soft and provided with low rigidity, such as thin steel plate at door portion or bumpers, where the impact force is alleviated and thereafter the collision is progressed further to a portion of the vehicle which is hard and is provided with high rigidity, such as the frame portion of the vehicle, on a plane where the axis of abscissa designates the collision force and the axis of ordinate designates the velocity, that is one of two-dimensional spaces provided by taking out one plane from the multi-dimensional space of the multi-dimensional space collision determining means. Therefore, erroneous operation such as expanding air bags by erroneously determining collision in the two-stage collision can be prevented by providing the threshold value having the function of identifying the two-stage collision in which collision is initiated at a portion of the vehicle which is soft and is provided with low rigidity, such as steel plate at door portion or bumpers where the impact force is alleviated and thereafter, the collision is progressed to a portion of the vehicle which is hard and is provided with high rigidity, such as the frame portion of the vehicle. Further, the constitution is provided with the threshold value having the function of identifying the two-stage collision in which the collision is initiated at a portion of the vehicle which is soft and is provided with low rigidity, such as thin steel plate at door portion or bumpers where the impact force is alleviated and thereafter, the collision is progressed further to a portion of the vehicle which is hard and having high rigidity, such as the frame portion of the vehicle and accordingly, erroneous operation expanding air bags unpreparedly in collision under the OFF condition can be prevented and the air bag can be expanded in a short period of time in collision under the ON condition.

The collision detecting device of a vehicle is provided with the collision acceleration detecting device detecting the accelerations of the vehicle in the forward and rearward direction and the side direction in which the vehicle collision acceleration detecting device for detecting the acceleration of the vehicle in the side direction is installed in addition to the vehicle collision acceleration detecting device in the forward and rearward direction. Therefore, the collision determination with high reliability can be carried out in a short period of time in the front collision in the forward and rearward direction, the oblique collision and the collision in the side direction by other vehicle whereby front air bags or side air bags can be expanded safely and swiftly. Further, the collision determination can be carried out pertinently in correspondence with collision from all the directions such as side collision, oblique collision, front collision, rear collision and the like since the vehicle collision acceleration detecting device capable of detecting collision accelerations of the vehicle in the forward and rearward direction and the side direction, is installed and therefore, a front air bag, an assistant's seat front air bag and side air bags can be expanded with high reliability in a short period of time.

The device of detecting collision of a vehicle is constituted by an analog calculator where the first-order lag element type filter for calculating the estimated velocity signal from the collision acceleration, the first-order lag element type filter for calculating the estimated displacement signal from the estimated velocity signal and the collision force calculating means for calculating the estimated collision force signal, are composed of analog calculators such as analog filters. The multi-dimensional space collision determining means is constituted by the digital controller including the multiplexer and the A/C converter. Therefore, since the first-order lag element type filter for calculating the estimated velocity signal from the collision acceleration, the first-order lag element type filter for calculating the estimated displacement signal from the estimated velocity signal and the collision force calculating means for calculating the estimated collision force signal, can be constituted by analog calculators such as analog filters, the device of detecting collision can be constituted without using a digital controller having high function. Further, since the first-order lag elements and the collision force calculating means inside of the controller are constituted by analog calculators, the collision detecting device can be constituted without using expensive CPU having high calculating speed in the digital controller.

The device of detecting collision of a vehicle is constituted by a single digital controller including the first-order lag element type filter for calculating the estimated velocity signal from the collision acceleration, the first-order lag element type filter for calculating the estimated displacement signal from the estimated velocity signal, the collision force calculating means for calculating the estimated collision force signal, the multi-dimensional space collision determining means and the A/D converter. Therefore, all the calculators of the first-order lag element type filter for calculating the estimated velocity signal from the collision acceleration, the first-order lag element type filter for calculating the estimated displacement signal from the estimated velocity signal, the collision force calculating means for calculating the estimated collision force signal and the multi-dimensional space collision determining means, can be constituted by the digital controller including the A/D converter and accordingly, promotion of noise resistance, reduction in the number of elements in electronic instruments and reduction in occurrence frequency of erroneous operation by malfunction of elements can be achieved whereby the reliability of the collision determination can be improved. Further, the total of the controller is constituted by the digital calculator and accordingly, the noise resistance which is problematic in analog elements is improved and the number of parts can significantly be reduced whereby the occurrence frequency of erroneous operation due to malfunction of elements is reduced and the reliability of the collision determination can be improved.

As described above, according to the device for detecting a collision of a vehicle in the present invention, the collision of a vehicle is determined based on the acceleration from the acceleration detecting means for detecting the collision acceleration of the vehicle, and the device is provided with the collision force calculating means for calculating the estimated collision force caused in the vehicle in collision based on the collision acceleration and the collision determining means for determining collision based on the estimated collision force and therefore, the collision determination can be carried out highly reliably and in a short period of time of determination.

The device is provided with the velocity calculating means for calculating the estimated velocity from the collision acceleration and the displacement calculating means for calculating the estimated displacement from the estimated velocity and the estimated collision force caused in the vehicle in collision is calculated based on the collision acceleration, the estimated velocity and the estimated displacement whereby the accurate estimated collision force can be calculated with small phase lag.

The collision determining means carries out collision determination by coordinate values in the multi-dimensional coordinates with variables of the estimated collision force, the collision acceleration, the estimated velocity and the estimated displacement and accordingly, pertinent collision determination can be carried out in accordance with various collision modes.

According to the collision force calculating means, a model of a vehicle is formed by the one degree of freedom model comprising mass, damper and spring whereby the estimated collision force is calculated. Therefore, the calculation of the estimated collision force can be conducted quantitatively and the determination of the threshold value in accordance with various collision modes can be facilitated.

According to the collision determining means, the estimated relative displacement of the passenger in respect of the vehicle is calculated and the collision determination is carried out based on the estimated relative displacement and the estimated collision force and accordingly, the passenger can firmly be prevented from colliding with the vehicle.

The estimated velocity and the estimated displacement can be calculated by a simple constitution by providing the first-order lag element type filter for calculating the estimated velocity from the collision acceleration and the first-order lag element type filter for calculating the estimated displacement from the estimated velocity.

The device of determining start-up of a passenger protecting device is provided with the collision force calculating means for calculating the estimated collision force caused in the vehicle in collision based on the collision acceleration from the acceleration detecting means for detecting the collision acceleration of the vehicle and the start-up determining means for determining the start-up of the passenger protecting device based on the estimated collision force and therefore, the start-up of the passenger protecting device can be carried out swiftly and firmly.

Furthers the device of determining start-up of the passenger protecting device is provided with the velocity calculating means for calculating the estimated velocity from the collision acceleration and starts up the passenger protecting device when the estimated velocity is the threshold value or more and the threshold value is determined based on the magnitude of the collision force and therefore, a pertinent threshold value in accordance with the collision situation can be set.

Also, the device for determining the start-up of the protecting device is provided with a plurality of acceleration detecting means which are set in the vehicle for detecting collision accelerations respectively in different directions and determines the start-up of the passenger protecting device based on the output from the plurality of acceleration detecting means and therefore, the passenger protecting device can be started up pertinently irrespective of the direction of collision of the vehicle.

What is claimed is:

1. A device for detecting a collision of a vehicle based on a collision acceleration of the vehicle detected by an acceleration detecting means, said device comprising:

a collision force calculating means for calculating an estimated collision force based on the collision acceleration, an estimated velocity of the vehicle, calculated from the collision acceleration, and an estimated displacement of the vehicle, calculated from the estimated velocity; and a collision determining means for discriminating a collision based on the estimated collision force.

2. The device according to claim 1, further comprising:

a velocity calculating means for calculating the estimated velocity of the vehicle from the collision acceleration;

a displacement calculating means for calculating the estimated displacement of the vehicle from the estimated velocity; and wherein the collision determining means discriminates whether a collision has occurred based on the estimated collision force, the collision acceleration, the estimated velocity and the estimated displacement.

3. The device according to claim 2, wherein the collision determining means discriminate whether the collision has occured in accordance with coordinate values in a multidimensional coordinate system having variables of the estimated collision force, the collision acceleration, the estimated velocity and the estimated displacement.

4. The device according to claim 1, wherein the collision calculating means calculates the estimated collision force using a model of the vehicle having one degree of freedom comprising a mass, a damper and a spring.

5. The device according to claim 1, wherein the collision determining means calculates an estimated relative displacement of a passenger in respect of the vehicle and discriminates whether the collision has occured based on the estimated relative displacement and the estimated collision force.

6. The device according to claim 1, further comprising:

a first-order lag element type filter for calculating the estimated velocity from the collision acceleration; and a first-order lag element type filter for calculating the estimated displacement from the estimated velocity.

7. A device for initiating a passenger protecting device comprising:

a collision force calculating means for calculating an estimated collision force of a vehicle based on:

a collision acceleration detected by an acceleration detecting means, an estimated velocity of the vehicle, calculated from the collision acceleration, and an estimated displacement, calculated from the estimated velocity; and an initiation means for initiating a passenger protecting device based on the estimated collision force.

8. The device according to claim 7, further comprising a velocity calculating means for calculating the estimated velocity from the collision acceleration; and wherein the initiation means starts up the passenger protecting device when the estimated velocity is equal to or larger than a threshold value and the threshold value is determined based on a magnitude of the collision force.

9. The device according to claim 7, further comprising a plurality of acceleration detecting means set in the vehicle for detecting a plurality of the collision accelerations respectively in different directions; and wherein the initiation means initiates the passenger protecting device based on outputs from the plurality of acceleration detecting means.

10. The device according to claim 8, further comprising a plurality of acceleration detecting means set in the vehicle for detecting a plurality of the collision accelerations respectively in different directions; and wherein the initiation means initiates the passenger protecting device based on outputs from the plurality of acceleration detecting means.

* * * * *

UNITED STATES PATENT AND TRADEMARK OFFICE
CERTIFICATE OF CORRECTION

PATENT : 5,904,730
DATED : May 18, 1999
INVENTOR(S) : Yoshiaki YAMAZAKI, Akihiko IMAGI, Takashi FURUI, Yukihiro OKIMOTO It is certified that error appears in the above-identified patent and that said Letters Patent is hereby corrected as shown below:

*Equation (5), col. 15, lines 58-5*, should read as follows:

$$m_1 \ddot{x}_1 + c_1 \dot{x}_1 + c_2(\dot{x}_1 - \dot{x}_2) + k_1 x_1 + k_2(x_1 - x_2) = f \text{ ; and}$$

$$m_2 \ddot{x}_2 + c_2 \dot{x}_1 (\dot{x}_2 - \dot{x}_1) + k_2(x_2 - x_1) = 0 \tag{5}$$

Signed and Sealed this

Twenty-third Day of November, 1999

Q. TODD DICKINSON

Attest:

*Attesting Officer*      *Acting Commissioner of Patents and Trademarks*